US011968266B2

(12) United States Patent
Rai

(10) Patent No.: US 11,968,266 B2
(45) Date of Patent: *Apr. 23, 2024

(54) METHODS AND APPARATUS FOR STORING AND/OR RETRIEVING SESSION STATE INFORMATION

(71) Applicant: Ribbon Communications Operating Company, Inc., Westford, MA (US)

(72) Inventor: Shambhu Dayal Rai, Monmouth Junction, NJ (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/819,550

(22) Filed: Mar. 16, 2020

(65) Prior Publication Data

US 2020/0220936 A1 Jul. 9, 2020

Related U.S. Application Data

(62) Division of application No. 14/038,276, filed on Sep. 26, 2013, now Pat. No. 10,637,929.

(60) Provisional application No. 61/881,272, filed on Sep. 23, 2013.

(51) Int. Cl.
*G06F 15/16* (2006.01)
*H04L 67/14* (2022.01)
(52) U.S. Cl.
CPC .................... *H04L 67/14* (2013.01)
(58) Field of Classification Search
CPC ....................................................... H04L 67/14

USPC .......................................................... 709/227
See application file for complete search history.

(56) References Cited

U.S. PATENT DOCUMENTS

| | | | | |
|---|---|---|---|---|
| 2005/0160095 A1* | 7/2005 | Dick | ...................... | H04L 67/14 |
| 2011/0149951 A1* | 6/2011 | Qiu | ........................ | H04L 12/66 |
| | | | | 370/352 |
| 2013/0097333 A1* | 4/2013 | Bathurst | ............. | H04L 65/1101 |
| | | | | 709/231 |
| 2013/0124641 A1* | 5/2013 | Ryabchun | ........... | G06F 11/3495 |
| | | | | 709/224 |
| 2014/0222890 A1* | 8/2014 | Zhu | ..................... | H04L 65/1104 |
| | | | | 709/203 |

* cited by examiner

*Primary Examiner* — Suraj M Joshi
*Assistant Examiner* — Joel Mesa
(74) *Attorney, Agent, or Firm* — Straub & Straub; Stephen T. Straub; Michael P. Straub

(57) ABSTRACT

Methods and apparatus related to the storage and/or recovery of session state information are described. A communications server, e.g., a web RTC server, supporting a communications session, stores session state information corresponding to the communications session in a client device, e.g., a user device including a web browser, participating in the communications session. Following a failure of the communications server, the client device establishes a new connection with a replacement communications server and communicates the stored session state information to the replacement communications server. In some embodiments, the session state information is communicated between a communications server and a client device in encrypted form via a secure HTTP web socket connection. In various embodiments, both the communications server and the replacement communications server include or have access to a shared encryption key.

24 Claims, 13 Drawing Sheets

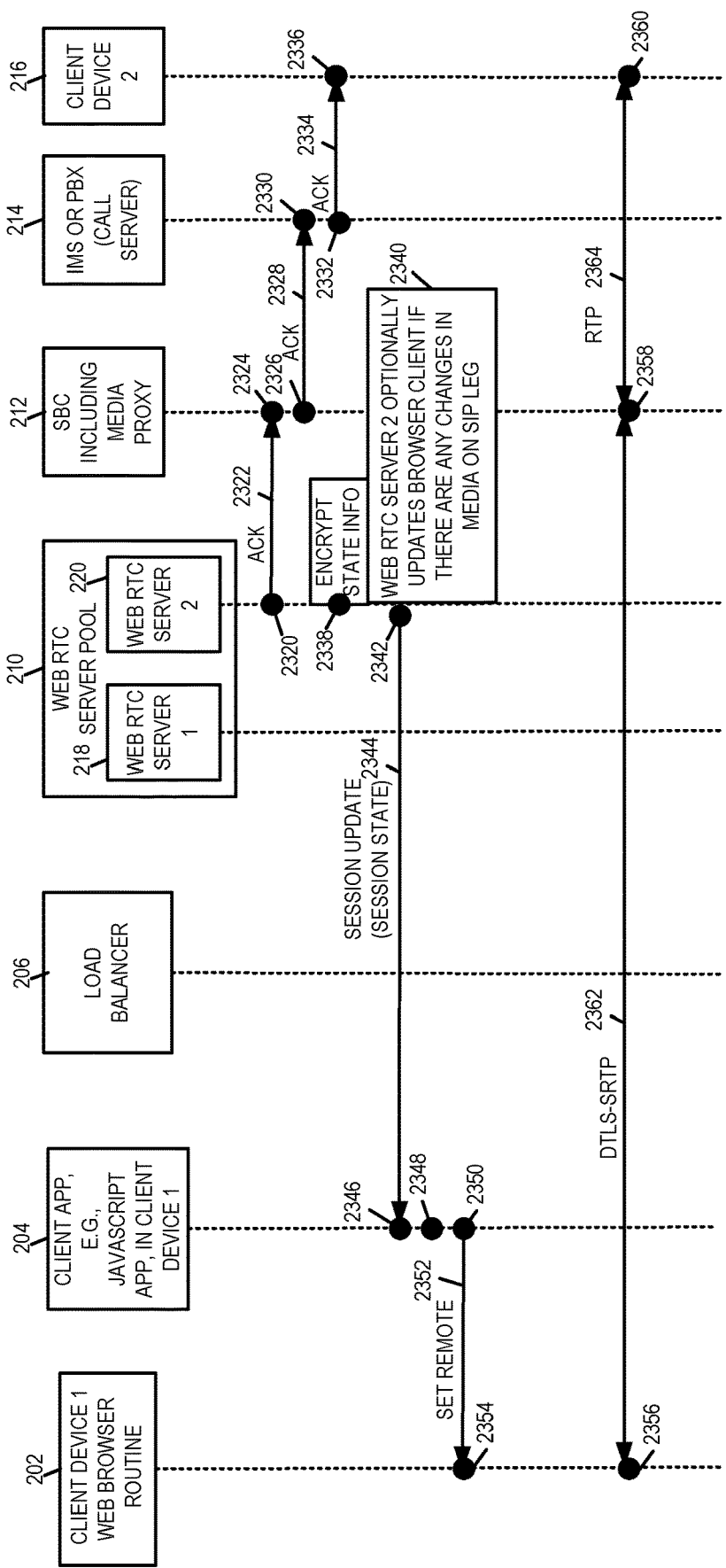

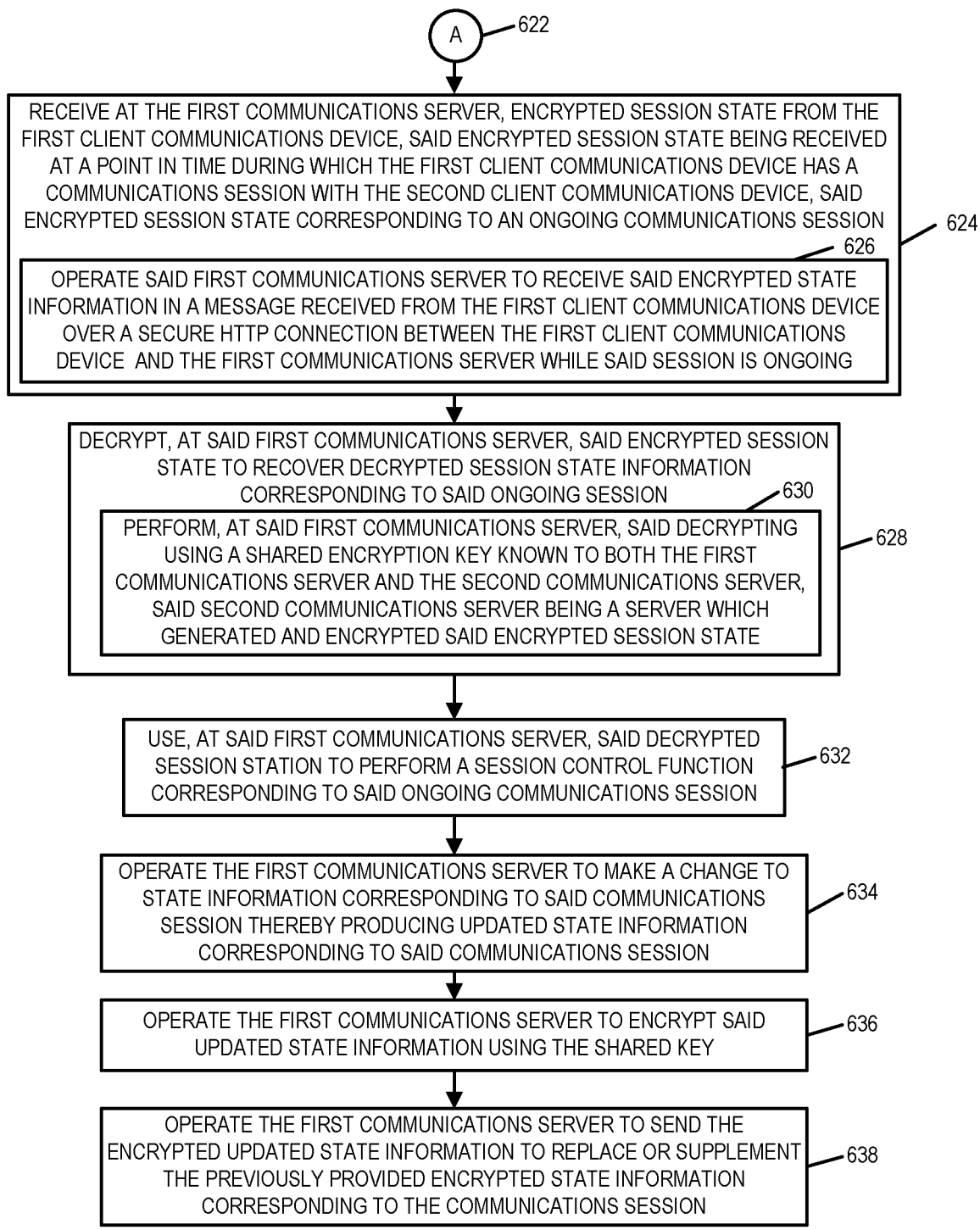

METHODS AND APPARATUS FOR STORING AND/OR RETRIEVING SESSION STATE INFORMATION

RELATED APPLICATIONS

The present application is a divisional of U.S. patent Ser. No. 14/038,276 filed Sep. 26, 2013 which claims the benefit of U.S. Provisional Patent Application Ser. No. 61/881,272 filed Sep. 23, 2013, entitled "METHODS AND APPARATUS FOR STORING AND/OR RETRIEVING SESSION STATE INFORMATION". Each of the aforementioned patent applications and publications is expressly incorporated by reference in its entirety.

FIELD OF INVENTION

Various embodiments relate to communications sessions, and more particularly, to methods and apparatus related to storing and/or retrieving session state information used by a server in a network to support a communications session between devices, e.g., two or more client devices.

BACKGROUND

There is a clear trend in the communication industry suggesting over the top communication, and web based communication services are increasing their share in the overall communication market. The availability of high speed Internet in homes and offices and the widespread proliferation of smart phones is making real time communication (RTC) over Internet possible.

Most of the Internet based real-time communication services (like Skype, Viber, etc.) need a plugin or propriety client on the PC/smartphone. Google and various browser vendors are working on a framework called 'WebRTC' to enable real time communication using a browser without the need for a propriety client or plugin. Standardization of the WebRTC is in progress in W3C and IETF.

WebRTC based communication service offer advantages over native applications in regard to convenience, platform compatibility, security, maintenance, richness, interoperability, standardization and reuse of RTC Functions, There is no need to install plug-in or native applications in WebRTC. WebRTC Application Programming Interfaces (APIs) shield the platform details and an application uses WebRTC APIs. A WebRTC App runs in a sandboxed environment in the browser, providing better security than when such a sandbox environment is not used. A newer version of a browser might break plugins which were designed to be compatible with an older version browser, while WebRTC APIs offer stability. Applications based on plugins lack the rich flexibility of native browser resources due to privilege restrictions. This, in turn limits the innovation possible with these applications. Plugins are proprietary, while WebRTC standardizes RTC functions and the interfaces leading to interoperable applications. Availability of RTC functions in browser will enable rapid application development with the reuse of browsers' RTC features across applications.

WebRTC is an emerging initiative to support full communications (including voice and video) natively from a web browser without the need for any additional plugins or a native Application on the client. This approach has the potential to spawn a new wave of "Over the top" players entering the market, as the barrier is now even lower. With the WebRTC approach, there is no longer a need to persuade a user to adopt a specific plugin.

Already Chrome, on android mobiles, supports WebRTC. It is anticipated, WebRTC will be used not only as a new communication service, but also to access the existing communication infrastructures like call centers from web site. So, there is a need of an interworking node, e.g., a WebRTC server node, to interwork the signaling over WebSocket to the Session Initiations Protocol (SIP) signaling used by legacy and IMS endpoints.

A WebRTC Server, which is an interworking node responsible for interworking the Application signaling over WebSocket to standard SIP signaling, needs to be highly available and scalable in order to support the real-time communication needs.

A webRTC server in the communications system, which is supporting an ongoing communications session, may fail. It would be advantageous if a replacement webRTC server could take over support for the ongoing communications session as quickly as possible, e.g., without disruption to the media communications between two endpoint user devices. Methods and apparatus that allow flexibility in terms of which webRTC servers can replace other webRTC servers in the communications system would be advantageous. It would also be advantageous if storage requirements and failover support could be achieved with little or minimal amounts of memory shared between or common to servers which may be used to support a communications session. By avoiding the use of shared or common memory to support failover in the case of a failed server, better scalability can be achieved and/or replacement or addition of a server may be possible than in the case where a common memory needs to be shared and accessible between servers supporting communications sessions.

In view of the above discussion, it should be appreciated that there is a need for improved methods and/or apparatus for supporting server failover, and/or for supporting redundancy with regard to session state that may be needed by a communications server to maintain a communications session. It would be particularly useful if at least some embodiments supported WebRTC failover without the need for a common shared and accessible memory in the communications network being used by WebRTC servers to share session state information.

SUMMARY

Methods and apparatus related to the storage and/or recovery of session state information are described. Various described methods and apparatus are well suited to communications including a client device including a web browser and communications servers, e.g., web servers. In some such embodiments, the web servers are web RTC servers in a pool of web RTC servers.

A communications server, e.g. WebRTC server, supporting a communications session, stores session state information corresponding to the communications session in a client device participating in the communications session. The session state information may be stored in a local storage device and need not, and in some embodiments is not, stored in a memory which can be accessed directly by other communications servers.

The stored session state information corresponding to an individual session in which a client device is involved may, and in some embodiments does include application layer session information, SIP (Session Initiation Protocol) stack information and/or transport information relating to the session. The application layer session information may, and in some embodiments does include information about the type of application and session, e.g., whether the session is an audio and/or video session. The application layer information may further include information identifying one or more web servers which support the communications session and are involved in control and/or data signaling as part of the session. The information may also include information identifying SIP and/or SDP servers which provide information relating to the session and/or information about the capabilities of one or more client devices involved in the session to which the information relates. The state information may also include subscriber privilege information indicating the type of services a client device which is a party to the session is allowed to receive, e.g., based on the user ID associated with the client device or based on other information. The privilege information may, for example indicate a client device is entitled to receive audio, video and/or data services. Service information may also be included in the state information as part of the application layer information or other state information. The service information may indicate a QOS (Quality of Service) level a client device or party to the communications session is entitled to receive, policy information and/or the number of client device which are participating and/or the maximum number of devices allowed to participate in the session. The SIP stack information included in the session state information may include session ID information and/or other information which may and sometimes is included in a SIP header. The information may include such things as caller or user IDs, e.g., identifiers identifying users of the client devices which are involved in the communications session, Dialog IDs identifying peer to peer relationships. It should be appreciated that devices may have multiple simultaneous ongoing calls with the Dialog IDs distinguishing between the different ongoing calls. The SIP session state information can, and also sometimes does include, addresses used for SIP signaling as part of the communications session to which the session state relates. The SIP signaling addresses can include local and remote SIP signaling addresses with the local SIP address corresponding the client device being serviced by the server and the remote SIP signaling address corresponding to a peer device in the communications session. The local and remote SIP signaling addresses provide the communications server, e.g., WebRTC server, the information as to which SIP servers signals should be sent as part of the communications session. This information is particularly important when the WebRTC server is acting as an interworking device and converting call control signals into SIP signals which are then to be handled by a SIP server or even when the WebRTC server receives a call control signal from a client device in the form of a SIP signal which the WebRTC server is then to pass to the appropriate SIP server for control related functions corresponding to the communications session. Transport state information included in state information for a communication session may, and in some embodiments does, include an IP address and port number to be used for communicating with a peer client device corresponding to the client device contacting the communications server for session support, and the IP address and/or port address corresponding to the client device contacting the communications server, e.g., WebRTC server, for session support.

In order to avoid loss of session state in the event of a failure of the communications server support a communications session, the communication server, after encrypting the session state information for a communications session in which a client device is involved, passes the session state to the client device for storage within the client device. Updated session state may, and in some embodiments is, passed to the client device whenever there is a change in the session state stored in the communications server. In this way a client device involved in a communications session becomes a backup storage device for session state information used by a communications server to support one or more communications sessions in which the client device is involved as a communications peer, e.g., end device in the communications session.

The session state may, and in some embodiments is, passed from the communications server to the client device via a secure communications link, e.g., a HTTP secure web socket. Failure of the communications server, e.g., WebRTC server, may and in some embodiments is detected by detecting a loss of the secure web socket as may be determined via a failure to receive an expected signal or heartbeat message corresponding to the secure connection between the client device and communication server.

Following a failure of the communications server, the client device establishes a new connection with another, e.g. a replacement, communications server and communicates the stored session state information to the replacement communications server. The client device need not be concerned or involved in which web server takes over for the failed server with the forwarding of a connection request or other HTTP signal used to establish a secure communications connection with a replacement server being directed in some embodiments to a communications server by a network load balancing device.

In some embodiments, the session state information communicated between the communications server originally handling a communications session and a client device in encrypted by the server providing the information prior to the information being transmitted to the client device for storage and forwarding to another server in the event of a failure of the link, e.g., secure HTTP web socket connection, with the communications server that was supporting the communications session.

In various embodiments, both the communications server and the replacement communications server include or have access to a shared encryption key allowing the server receiving the session state information from the client device to decrypt and use the information to maintain the ongoing communications session.

Accordingly, a communications session may be maintained in the event of a failure of a WebRTC or other communications server involved in the control signaling associated with a communications session.

It should be appreciated that Web signaling such as HTTP and/or other browser related protocols can be used to establish a connection between the client device including a Web browser and the communication server, e.g., WebRTC server, involved in session related control related signaling. The secure communications channel, e.g., secure Web socket, established between the client device and communication server serves as a communication path over which session, e.g., call, related signaling can be transmitted. The communication server may, and in some embodiments does, provide control signal interworking functions. Accordingly while SIP control signals may be used by the client device, other control signal formats and/or protocols may be used for communicating session, e.g., call, related control signals between a client device and communication server, e.g. WebRTC server. The WebRTC server can convert non-sip signals into SIP signals and send them to a SIP server corresponding to the client device for call control purposes. In the case where the client device supports SIP signaling the WebRTC server can simply forward SIP call control signals received from a client device to the SIP server responsible for processing such signals as part of a call or other communications session.

As should be appreciated the data signaling portion of a call or other communications session may continue for a period of time without the need for the control signaling paths associated with a call or other ongoing session being maintained. Accordingly failure of a WebRTC server involved in the control signaling path associated with a call or other session need not result in the teardown of the ongoing call since, in accordance with the invention, a client device can contact another WebRTC and provide the session state information needed by the server to maintain or modify control related parameters.

A client device can quickly detect a failure of secure socket with the web or other communications server it is using to support session, e.g., call, related control signaling. Since, in accordance with the invention, a client device detecting loss of a connection with a WebRTC server automatically establishes a secure connection with another WebRTC server and automatically provides it with the relevant session state for one or more sessions in which the client device is involved, a client device detecting a failure of a WebRTC server via a loss of a connection can continue its communications sessions uninterrupted without the need for complicated and/or costly hardware in the communications network intended to support communications server failover.

The client device centric support for WebRTC failover makes it far easier to add and remove WebRTC servers with concern for the effect on ongoing communications sessions than might otherwise be possible. In fact, in some embodiments a communications server, e.g., WebRTC server, is removed from service without first notifying or offloading communications sessions being handled by the server to another device with the client devices being left to automatically establish a connection with another communications server used for session control purposes. This may occur as part of a routine, e.g., scheduled, maintenance.

The client device centric support for communications server failover also has the advantage of avoiding the need for larger shared memory between communications servers to enable recovery of session state information which is the case in many system where servers are configured to share memory to facilitate data recovery and/or backing up of data in the event of a server failure.

An exemplary method of operating a first communications device, e.g., a first client communications device including a web browser, in accordance with some embodiments, comprises: downloading a client application; operating the client application, within a web browser on the first communications device, to send a signal to initiate a communications session with a second communication device; receiving session state information from a first communications server which uses SIP signaling to establish a communications session with said second communications device; operating the web browser to store said session state information in said first communications device; and operating the web browser to provide said stored session state information to a second communications server following a loss of a connection with the first communications server.

An exemplary first communications device, in accordance with some embodiments, includes: a module configured to download a client application; a module configured to operate the client application, within a web browser on the first communications device to send a signal to initiate a communications session with a second communication device; a module configured to receive session state information from a first communications server which uses SIP signaling to establish a communications session with said second communications device; a module configured to operate the web browser to store said session state information in said first communications device; and a module configured to operate the web browser to provide said stored session state information to a second communications server following a loss of a connection with the first communications server.

An exemplary communications method, in accordance with some embodiments, comprises: receiving, at a first communications server, encrypted session state from a first client communications device, said encrypted session state being received at a point in time during which said first client communications device has a communications session with a second client communications device, said encrypted session state corresponding to an ongoing communications session; decrypting, at said first communications server, said encrypted session state to recover decrypted session state information corresponding to said ongoing communications session; and using, at said first communications server, said decrypted session state to perform a session control function corresponding to said ongoing communications session.

An exemplary first communication server, e.g., a first RTC web server, in accordance with some embodiments, includes: a module configured to receive encrypted session state from a first client communications device, said encrypted session state being received at a point in time during which said first client communications device has a communications session with a second client communications device, said encrypted session state corresponding to an ongoing communications session; a module configured to decrypt said encrypted session state to recover decrypted session state information corresponding to said ongoing communications session; and a module configured to use said decrypted session state to perform a session control function corresponding to said ongoing communications session.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE FIGURES

FIG. 2 comprises FIGS. 2A, 2B, 2C and 2D.

FIG. 2D is a fourth part of a drawing illustrating exemplary signaling and exemplary operations in accordance with an exemplary embodiment.

FIG. 6 comprises FIGS. 6A and 6B.

FIG. 6B is a second part of a flowchart of an exemplary communications method in accordance with an exemplary embodiment.

DETAILED DESCRIPTION

Figure 1:
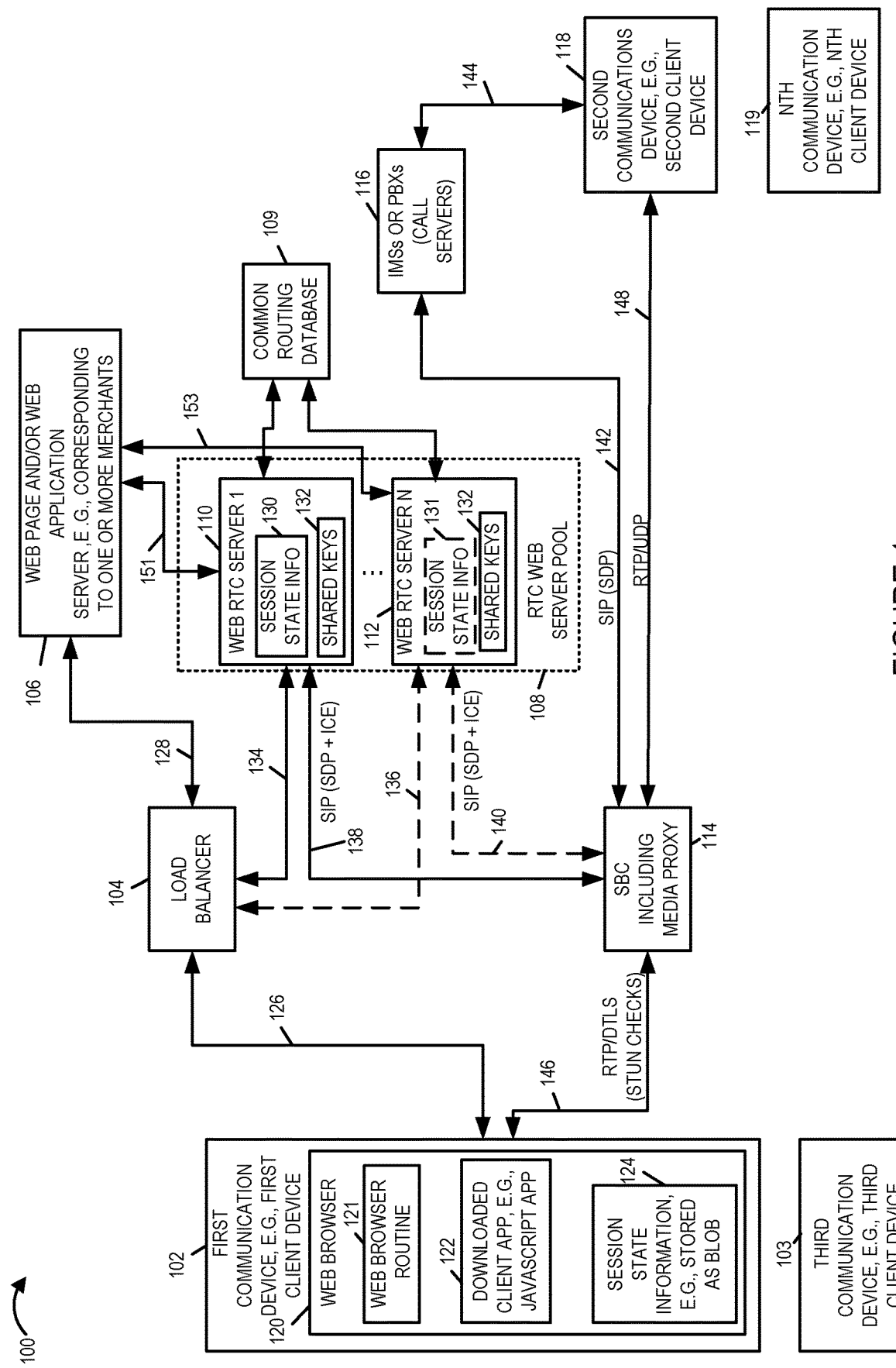
FIG. 1 is a drawing of an exemplary communications system in accordance with an exemplary embodiment.

FIG. 1 illustrates an exemplary communications system 100 in accordance with an exemplary embodiment. Exemplary communications system 100 includes a plurality of communications devices (first communications device 102, second communications device 118, third communications device 103, . . . Nth communications device 119). The communications devices (102, 118, 103, . . . 119) are, e.g., client communications devices including a web browser. A communications device, e.g., first communications device 102, is, e.g., a user communications device such as, e.g., a cell phone or other device with voice, video and/or multimedia session capabilities. Exemplary first communications device 102 includes a web browser 120. The web browser 120 includes a web browser routine 121 and a downloaded client application 122, e.g., a downloaded JavaScript application. Web browser 120 further includes session state information 124, e.g., session state information stored as blob. In some embodiments, the stored session state information 124 is encrypted session state information and the first communications device 102 does not include the encryption key needed to decrypt the encrypted session state information.

Exemplary system 100 further includes a load balancer 104, a web page and/or web application server 106, a web server pool 108, a session border controller (SBC) 114 including a media proxy, IMSs or PBXs 116, and a common routing database 109.

RTC web server pool 108 includes a plurality of web RTC servers (web RTC server 1 110, . . . , web RTC server N 112). Each web RTC server (110, . . . , 112) in the pool 108 includes shared keys 132, allowing one web server in the pool to decrypt encrypted session state information which was encrypted by another web server in the pool.

Web page and/or web application server 106, in some embodiments, corresponds to one or more merchants. Downloaded client application 122, e.g., a JavaScript App, may be downloaded from web page and/or web application 106. In some embodiments, a web server in pool 108 may operate as a proxy for web page and/or web application server 106 and the downloaded client application may be downloaded from a web RTC server.

Load balancer 104 decides, in accordance with the load balancer's logic, which particular web RTC server in the RTC web server pool 108 should service a particular communications device and/or particular communications session, e.g., in response to loading condition, failure conditions, etc.

Session state information corresponding to an ongoing communications session may be communicated from a web server with which the communications device has a connection, e.g., a secure web socket connection, to the communications device. For example, consider that first communications device 102 has a secure web socket connection with web server 1 110 and has an ongoing communication with second communications device 118, session state information 130 may be encrypted and communicated to first communications device 102 and stored as information 124. Further consider that server 1 110 fails and the connection between server 1 110 and first communications device 102 is lost. Further consider that the first communications device 102 establishes a new secure web socket connection with server N 112. Stored session state information 124, corresponding to the ongoing session, is communicated from first communications device 102 to web server N 112, decrypted, stored as session state information 131. The received decrypted session state information is used by web RTC server N 112 allowing the ongoing communications session to continue, with web RTC server N 112 replacing failed web RTC server 1 110.

Exemplary signaling 126 between first communications device 102 and load balancer 104 is, e.g., HTTP signaling. Exemplary signaling 128 between load balancer 104 and web page and/or web application 106 is HTTP signaling. In various embodiments, a secure HTTP connection, e.g., a secure web socket connection, may be established between first communications device and a web server in pool 108. SIP messages, control messages, control information, and/or state information, e.g., encrypted session state information, may be, and sometimes is, communicated over the secure web socket connection.

Exemplary signaling (151, . . . , 153) between web page and/or web application server 106 and web RTC servers (110, . . . , 112) is, e.g., HTTP signaling. Exemplary signaling (134, 136) between load balancer 104 and web servers (110, . . . , 112) is, e.g., HTTP signaling. Exemplary signaling (138, 140) between web RTC servers (110, 112) and SBC 114 is, e.g., SIP signaling including SDC+ICE information. Exemplary signaling 142 between SBC 114 and IMS or PBX 116 is, e.g. SIP signaling including SDP information. Exemplary signaling 144 between IMX or PBX 116 and second communications device 118 is, e.g., SIP signaling including SDP information. Exemplary signaling 146 between first communications device 102 and SBC 114 is media signaling including, e.g., RTP/DTLS signaling and STUN check signaling. Exemplary signaling 148 between SBC 114 and second communications device 118 is media signaling including, e.g., RTP/UDP signaling.

The common routing database 109 may be used by the web servers of the pool 108, e.g., for determining routing between first and second communications devices. In various embodiments, the session state information corresponding to an ongoing communications session is not stored in a common database accessible by the servers (110, . . . , 112) of pool 108, but is rather stored in a client communications device, e.g., device 102.

Figure 2A:
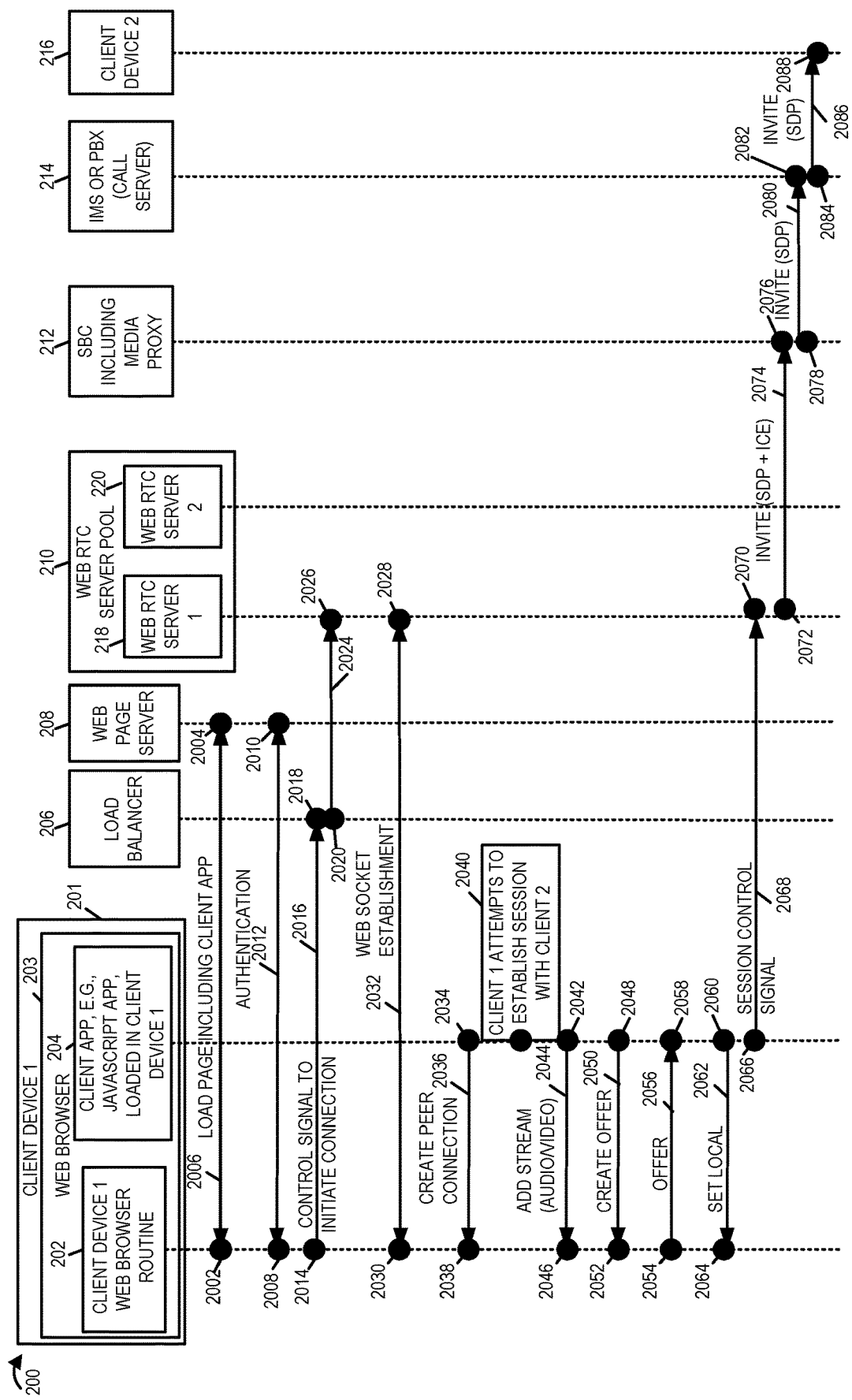
FIG. 2A is a first part of a drawing illustrating exemplary signaling and exemplary operations in accordance with an exemplary embodiment.
Figure 2B:
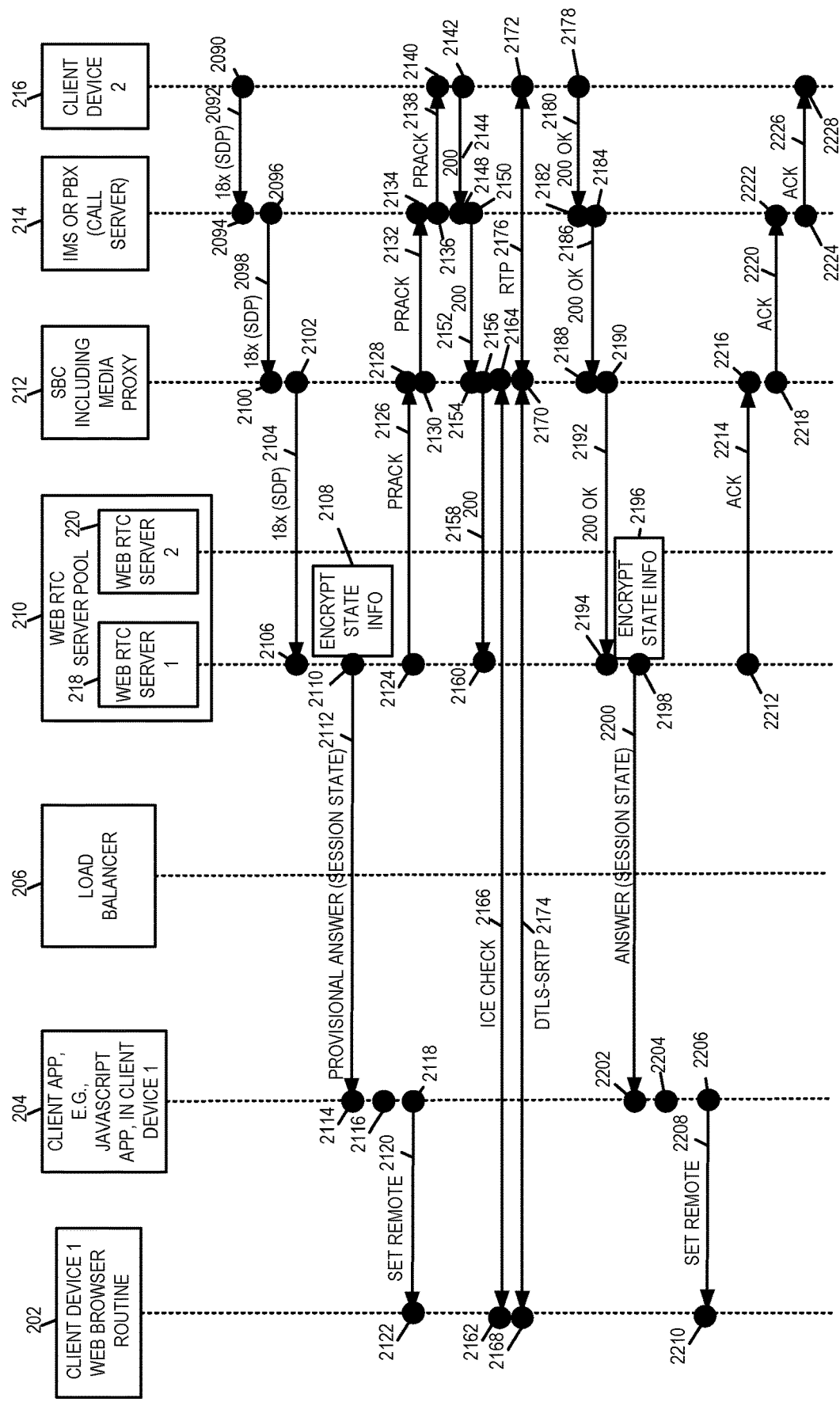
FIG. 2B is a second part of a drawing illustrating exemplary signaling and exemplary operations in accordance with an exemplary embodiment.
Figure 2C:
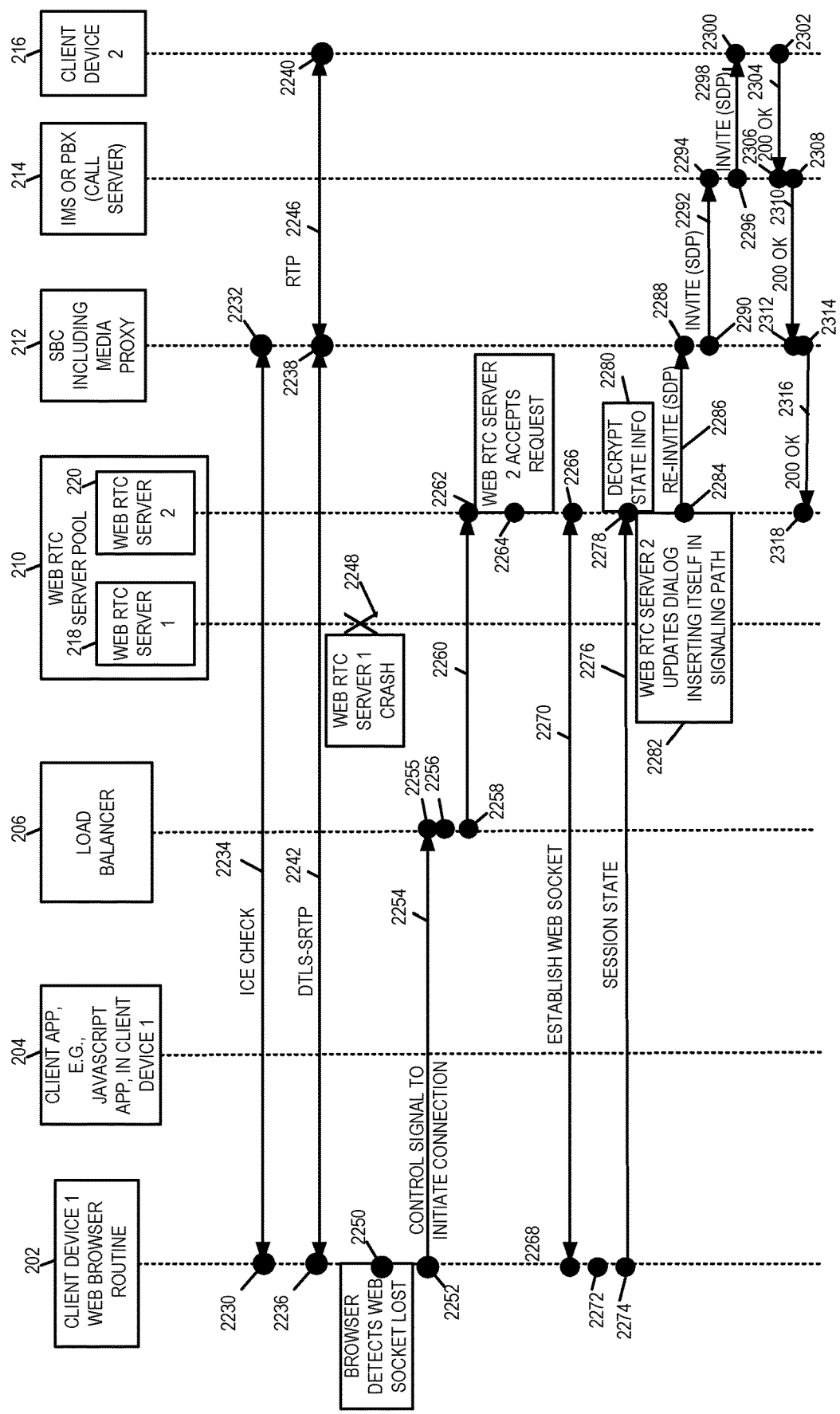
FIG. 2C is a third part of a drawing illustrating exemplary signaling and exemplary operations in accordance with an exemplary embodiment.

FIG. 2, comprising the combination of FIG. 2A, FIG. 2B, FIG. 2C and FIG. 2D, is a drawing 200 illustrating exemplary signaling and exemplary operations in accordance with an exemplary embodiment.

Drawing 200 illustrates an exemplary client device 1 201 including exemplary web browser 203 including exemplary client 1 web browser routine 202, a client app 204, e.g., a JavaScript app, loaded in client device 1, a load balancer 206, a web page server 208, a web RTC server pool 210 including web RTC server 1 218 and web RTC server 2 220, a session border controller (SBC) 212 including a media proxy, a IMS or PBX 214, e.g., a call server, a client device 2 216.

Client device 1 202 is, e.g., first communications device 102 of FIG. 1, and web browser 203 is, e.g., web browser 120 of FIG. 1. Client device 1 web browser routine 202 and client app 204 are, e.g., web browser routine 121 and downloaded client app 122, respectively, of first communications device 102 of FIG. 1. Load balancer 206 is, e.g., load balancer 104 of FIG. 1. Web page server 208 is, e.g., web page serer 106 of FIG. 1. Web RTC server pool 210, web RTC server 1 218, and web RTC server 2 220 are, e.g., RTC web server pool 108, web RTC server 1 110, and web RTC server N 112, respectively, of FIG. 1. SBC 212 is, e.g., SBC 114 of FIG. 1. IMS or PBX 214 is, e.g., IMS or PBX 116 of FIG. 1. Client device 2 216, is, e.g., second communications device 118 of FIG. 1.

In step 2002, client device 1 web browser routine 202 is operated to perform operations to load a page including a client app 204 from web page server 208. In step 2004 the web page server 208 is operated to send the web page including the client app to client device 1 browser. Signaling 2006 includes signaling to request and deliver the page including the client app, e.g., JavaScript app. In some embodiments, the web page server 208 is a web page server supporting one or more merchant websites, and the web page server 208 provides JavaScript libraries to client device 1, e.g., in response to a request from the client device 1. In some other embodiments, web page server 208 proxies/ redirects a request for JavaScript libraries toward a web RTC server, which supplies Javascript libraries to client device 1, e.g., in response to a request form client device 1.

In step 2008 client device 1 web browser communicates with web page server 208 communicating authentication signaling 2012. In various embodiments a merchant website, provides the identify and authentication to the user of client device 1. In step 2010 web browser page server 208, supporting a merchant, communicates with client device 1 web browser routine 202 communicating authentication signaling 2012. In various embodiments, the web RTC servers (218, 220) will honor the user identify and authentication as the merchant website.

In step 2014, client device 1 web browser routine 202 generates and transmits a control signal 2016 to initiate a connection. Signal 2016 is received by load balancer 206 in step 2018, and the load balancer decides, e.g., in accordance with its selection logic, that web RTC server 1 218 is to service client device 1, with the regard to connection request. In step 2020, load balancer 206 generates and sends control signal 2024 to web RTC server 1 218. In step 2026 web RTC server 1 218 receives the control signal 2024, and proceeds to establish a connection with client device 1. In step 2028 web RTC server 1 218 is operated to establish a web socket with client device 1 web browser. In step 2030 client device 1 web browser is operated to establish a web socket with web RTC server 1 202. In performing the web socket establishment, signaling 2032 is communicated between client device 1 web browser routine 202 and web RTC server 1 218.

In step 2034, client app 204 send information 2036 to web browser routine 202 to create a peer connection, and in step 2038 the client device browser routine 202 receives information 2036 and creates a peer connection. In step 2040, client 1 attempts to establish a session, e.g., a call, with client 2, via the client app 204. For example, the user of client device 1 clicks on a link to initiate a call to the called party, e.g., corresponding to sales or support client device, e.g., client device 2 216, e.g., a phone. In step 2042, the client app 204 sends information 2044 to client web browser routine 202 to add a stream, e.g., an audio/video stream, and in step 2046 the web browser routine 202 receives information 2044 and performs operations to add the requested stream.

In step 2048 the client app 204 sends information 2050 to create an offer, e.g., an SDP offer for making a call, to client device web browser routine 202, which receives the information in step 2052. In step 2054, the client device web browser routine 202 creates the offer 2056 and sends the offer 2056 to client app 204, which receives the offer in step 2058.

In step 2060 client app 204 generates and sends information 2062 to client device web browser routine 202 to set local; and the information 2062 is received in step 2064 by client device 1 web browser 202 which sets local.

In step 2066 the client app 204 generates and sends session control signal 2068 including the session offer to web RTC server 1 218 over the established web socket. Signal 2068 is received and processed by RTC web server 1 218 in step 2070. In step 2070, the RTC web server 1 218 converts the session offer received over the web socket into standard SIP/SDP signaling. In step 2072 web RTC server 1 218 generates and transmits a signal 2074, including a SIP Invite message including SDP and ICE information to SBC 212. SBC 212 receives signal 2074 in step 2076 and processes the received signal. In step 2078, SBC generates and transmits a signal 2080 including a SIP INVITE message including SDP information. In step 2082, IMS or PBX 214 receives signal 2080 and processes the received information. In step 2084, the IMS or PBX 214 generates and transmits signal 2086 including an INVITE message including SDP information to client device 2 216, which is received and processed by client device 2 216 in step 2088.

In step 2090 client device 2 216 generates and sends signal 2092 including a SIP 18x message including SDP information, to IMS or PBX 214, which is received and processed in step 2094 by IMS or PBX 214. In step 2096 IMS or PBX 214 generates and sends signal 2098 including a SIP 18x message including SDP information to SBC 212, which is received and processed in step 2100 by SBC 212. In step 2102, SBC 212 generates and sends signal 2104 including a SIP 18x message including SDP information to web RTC server 1 218, which is received and processed in step 2106 by web RTC server 1 218.

In step 2108 web RTC server 1 218 encrypts session state information. In step 2110 web RTC server 1 218 generates and transmits signal 2112 including a provisional answer and the encrypted session state information to client app 204 via the established web socket. In step 2114, the client app 204 receives signal 2114 including the provisional answer and the encrypted session state information. In step 2116 the client app 204 stores the encrypted session state information. In step 2118, the client app sends information 2120 to set the remote in the web browser routine 202. In step 2122 client device 1 web browser routine 202 receives signals 2120, recovers the communicated information and sets remote.

In step 2124, web RTC server 1 218 generates and sends signal 2126 including a SIP PRACK message to SBC 212, which receives signal 2126 in step 2128. In step 2130 SBC 212 generates and transmits signal 2132 including PRACK message to IMS or PBX 214, which is received and processed in step 2134. In step 2136 the IMS or PBX 214 generates and transmits signal 2138 including PRACK message to client device 2 216, which is received and processed in step 2140, by client device 2 216.

In step 2142 client device 2 216 generates and sends signal 2144 to IMS or PBX 214 including a SIP 200 message, which is received and processed in step 2148. In step 2150 IMS or PBX 214 generates and sends signal 2152 including a SIP 200 message to SBC 212, which is received and processed in step 2154 by SBC 212. In step 2156 SBC 212 generates and sends signal 2158 including a SIP 200 message to web RTC server 1 218, which is received and processed in step 2160 by web RTC server 1 218.

In steps 2162 and 2164, client device 1 web browser 202 and SBC 2156 communicate signaling 2156 including signaling related to an ICE check. In step 2168 and step 2170, client device 1 web browser 202 and SBC communicate signaling 2174 including DTLS and SRTP. In step 2170 and 2172 SBC 212 and client device 2 216 communicate signaling 2176 including RTP signaling. In step 2170 SBC 212 performs conversions.

In step 2178 client device 2 216 generates and sends signal 2180 to IMS or PBX 214 including a SIP 200 OK message, which is received and processed in step 2182. In step 2184 IMS or PBX 214 generates and sends signal 2186 including a SIP 200 OK message to SBC 212, which is received and processed in step 2188 by SBC 212. In step 2190 SBC 212 generates and sends signal 2192 including a SIP 200 OK message to web RTC server 1 218, which is received and processed in step 2194 by web RTC server 1 218.

In step 2196 web RTC server 1 218 encrypts state information, and in step 2198 web RTC server 1 218 generates and transmits signal 2200 including an answer and the encrypted session state information to client app 204 via the established web socket. In step 2202, the client app 204 receives signal 2200 including the answer and the encrypted session state information. In step 2204 the client app 204 stores the encrypted session state information. In step 2206, the client app sends information 2208 to set the remote in the client device 1 web browser. In step 2210 client device 1 web browser routine 202 receives signal 2208 and processes the received information.

In step 2212 web RTC server 1 218 generates and transmits signal 2214 including a SIP ACK message, which is received by SBC 212 in step 2216. In step 2218 SBC 212 generates and transmits signal 2220 including a SIP ACK message, which is received by IMS or PBX 214 in step 2222. In step 2224 IMS or PBX 214 generates and transmits signal 2226 including a SIP ACK message, which is received by client device 2 216 in step 2228.

In steps 2230 and 2232, client device 1 web browser routine 202 and SBC 212 communicate signaling 2234 including signaling related to an ICE check. In step 2236 and step 2238, client device 1 web browser routine 202 and SBC 212 communicate signaling 2242 including DTLS and SRTP signaling. In step 2238 and 2240 SBC 212 and client device 2 216 communicate signaling 2246 including RTP signaling. In step 2238 SBC 212 performs conversions.

In step 2248, web RTC server 1 218 crashes. Subsequently, in step 2250, client device 1 web browser routine 202 detects that the web socket has been lost, e.g., from a loss of a heartbeat message. In step 2252, client device 1 web browser routine 202 generates and transmits a control signal 2254 to initiate a connection, e.g., an HTTP Post request. Control signal 2254 is received in step 2255 by load balancer 206. In step 2256 load balancer selects web RTC server 2 220 from the web server pool, e.g., in accordance with its selection logic from among the potential currently available RTC web servers in the pool. In various embodiments, web RTC server pool 210 including additional web RTC servers in addition to web RTC server 1 218 and web RTC server 2 220.

In step 2258 load balancer 206 generates and sends control signal 2260 to web RTC server 2 220 to forward the request, which is received in step 2262. In step 2264, web RTC server 2 220 decides to accept the request. In steps 2266 and 2268, web RTC server 2 220 and client device 1 web browser routine 202 are operated to establish a web socket, which includes communicating web socket establishment signaling 2270.

In step 2272, client device 1 web browser routine 202 retrieves stored session state corresponding to the ongoing communications session with device 2 216, e.g., the most recently stored encrypted session state information. In step 2274, client device 1 web browser routine 202 generates a signal 2276 including the retrieved session state information, e.g., retrieved encrypted session state information, and transmits signal 2276 over the established web socket with web RTC server 2 220.

In step 2278, web RTC server 2 220 receives signal 2276, and in step 2280, web RTC server 2 decrypts the encrypted session state information which was communicated in signal 2276. In step 2282, web RTC server 2 220 uses the state information and updates dialog inserting itself into the signaling path.

In step 2284 web RTC server 2 220 generates and transmits a signal 2286 including a SIP Re-INVITE message including SDP information to SBC 212, which receives signal 2286 in step 2288. In step 2290, SBC 212 generates and transmits a signal 2292 including a SIP INVITE message including SDP information. In step 2294, IMS or PBX 214 receives signal 2292 and processes the received information. In step 2296, the IMS or PBX 214 generates and transmits signal 2298 including an INVITE message including SDP information to client device 2 216, which is received and processed by client device 2 216 in step 2300.

In step 2302 client device 2 216 generates and sends signal 2304 to IMS or PBX 214 including a SIP 200 OK message, which is received and processed in step 2306. In step 2308 IMS or PBX 214 generates and sends signal 2310 including a SIP 200 OK message to SBC 212, which is received and processed in step 2312 by SBC 212. In step 2314 SBC 212 generates and sends signal 2316 including a SIP 200 OK message to web RTC server 2 220, which is received and processed in step 2318 by web RTC server 2 220.

In step 2320 web RTC server 2 220 generates and transmits signal 2322 including a SIP ACK message, which is received by SBC 212 in step 2324. In step 2326 SBC 212 generates and transmits signal 2328 including a SIP ACK message, which is received by IMS or PBX 214 in step 2330. In step 2332 IMS or PBX 214 generates and transmits signal 2334 including a SIP ACK message, which is received by client device 2 216 in step 2336.

In step 2338 web RTC server 2 220 encrypts state information. In step 2340 web RTC server 2 optionally updates the browser client if there are any changes in media on the SIP leg. In step 2342, web RTC server 2 220 generates and transmits signal 2344 including a session update message and including encrypted session state information. In step 2346 client app 204 receives signal 2344, and in step 2348 the client app 204 stores the received encrypted session state information. In step 2350 client app 204 sends information 2352 to set the remote in the web browser. In step 2354, the web browser routine 202 receives the information 2352 and uses the received information, e.g., to set parameters related to the ongoing communications session.

In step 2356 and step 2358, client device 1 web browser routine 202 and SBC 212 communicate signaling 2362 including DTLS and SRTP signaling. In step 2358 and 2360 SBC 212 and client device 2 216 communicate signaling 2364 including RTP signaling. In step 2358 SBC 212 performs conversions.

Some aspects and/or features with regard to the some embodiments of the method illustrated in FIG. 2 will now be described. When a web RTC session is established, a web RTC server, e.g., web RTC server 1 218, pushes the session state information for the session to the client app in the browser, e.g., client app 204. Subsequently, the web RTC server, e.g., web RTC server 1 218, will push the session state information to the client app, e.g., client app 204, every time there is a change in session state or the session is modified. The web RTC server, e.g., web RTC server 1 218, encrypts and signs the session state information for additional security. A pool of web RTC servers, e.g., pool 210, will share the encryption keys in a way that a message encrypted by one web RTC server, e.g., web RTC server 1 218, in the pool can be decrypted by another web RTC server, e.g., web RTC server 2 220, in the pool. A web RTC server in the pool will be able to validate and honor the signs/certificate of other web RTC servers in the pool.

A client app in the browser, e.g., client app 204, stores the session state information as blob in the memory. In various embodiments, this stored session state information, e.g., in blob, is not interpreted by the client app 204. In various embodiments, client app 204 does not include or have access to a key needed to decrypt the encrypted session state information.

In various embodiments, the client app, e.g., client app 204, and the web RTC server, e.g., web RTC server 1 218, corresponding to the established web socket, exchange an application level heartbeat message to ensure that the web socket connection is up and that the client app, e.g., client app 204, and the web RTC server, e.g., web RTC server 1 218, are able to talk to one another. In some embodiments, in which the client app 204 is on Mobile, the web RTC server contacts the mobile using optimized messaging frameworks such as, e.g., Google Could messaging for Android and Apple APNS for iOS mobiles.

When an active web RTC server, e.g., web RTC server 1 218, goes down, the client device, e.g., client device 1, detects failure of the server (heartbeat failed), and the client device, which seeks to establish a new web socket connection, sends a request toward the web RTC server in the pool of web RTC servers which are up. Optionally, the HTTP load balancer 206 can select another web RTC server for the request, and forward the request to the selected web server, e.g., web RTC server 2 220.

The newly active web RTC server, e.g., web RTC server 2 220, which received and accepted the connection request, and subsequently established a web socket connection, requests any stored session state information. If valid session state information is received, the web RTC server, e.g., web RTC server 2 220, will update the call state (SIP stack structures and application data related to a session) in its memory. From this point on, any new request for the session will be handled by the new web RTC server, e.g., web RTC server 2 220, as a normal request with a session based on session state information.

When the client device, e.g., client device 1 201, sends any mid-dialog request, the request will be sent through the web socket connection to the newly active web RTC server, e.g., web RTC server 2 220.

When, a mid-dialog request is received from a SIP endpoint, e.g., client device 2 216, the load balancer, e.g., load balancer 206, in front of the web RTC server pool will route the request to the correct web RTC server instance, e.g., web RTC server 2 220. The web RTC server, e.g., web RTC server 2 220, will in turn select the web socket for sending the message toward the client device, e.g., client device 1.

Figure 3:
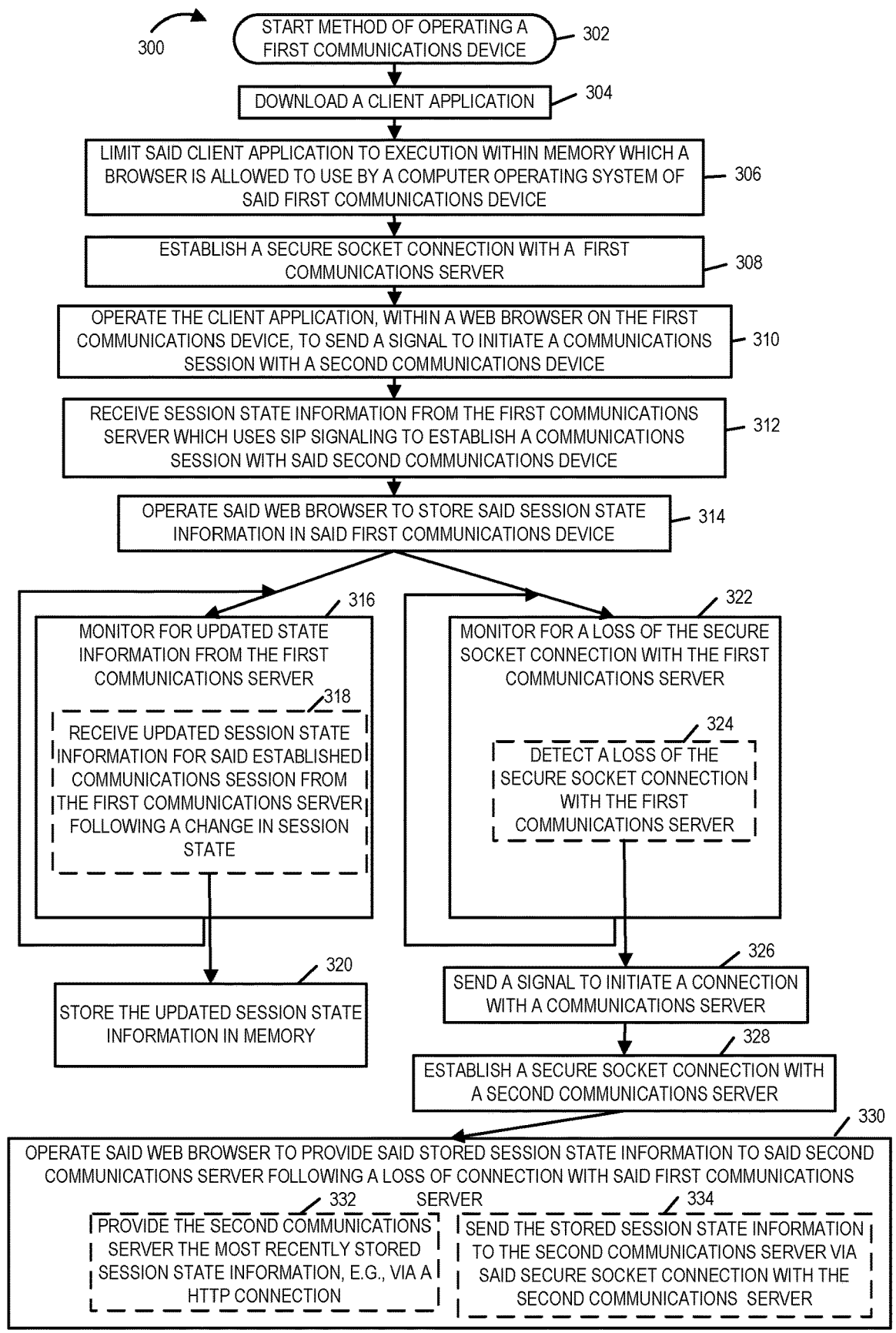
FIG. 3 is a flowchart of an exemplary method of operating a first communications device, e.g., a client device, in accordance with an exemplary embodiment.

FIG. 3 is a flowchart 300 of an exemplary method of operating a first communications device in accordance with an exemplary embodiment. The first communications device is, e.g., a first user communications device such as, e.g., a cell phone or other device with voice, video and/or multi-media session capabilities. The first communications device implementing the method of flowchart 300 of FIG. 3 is, e.g., first communications device 102 of FIG. 1 or client device 1 201 of FIG. 2. The first communications device is, e.g., a client device including a web browser. Operation starts in step 302, in which the first communications device is powered on and initialized. Operation proceeds from step 302 to step 304, in which the first communications device downloads a client application. In various embodiments, the client application is a JavaScript application. Operation proceeds from step 304 to step 306.

In step 306 the first communications device limits the client application to execution within memory which a browser is allowed to use by a computer operating system of the first communications device. Operation proceeds from step 306 to step 308.

In step 308 the first communications devices establishes a secure socket connection with a first communications server, e.g., a first web server. Operation proceeds from step 308 to step 310.

In step 310 the first communications device operates the client application, within a web browser of the first communications device, to send a signal to initiate a communications session with a second communications device. The signal to initiate the communication session is, e.g., a call control signal, which may be a SIP signal, sent over a HTTP connection, e.g., a secure socket connection, with a first communications server, e.g., a first web RTC server. The second communications device is, e.g., a second user device such as a cell phone or other device with voice, video, and/or multi-media session capability. Operation proceeds from step 310 to step 312.

In step 312 the first communications device receives session state information from a first communications server which uses SIP signaling to establish a communications session with the second communications device. In various embodiments, the first communications server establishes said communications session with the second communications device by sending a SIP signal via a session border controller through which control signaling is communicated for establishing a session with the second communications device. Operation proceeds from step 312 to step 314.

In step 314 the first communications device operates the web browser to store the session state information in the first communications device. Operation proceeds from step 314 to steps 316 and 322.

In step 316, the first communications device monitors for updated state information from the first communications server. Step 316 is performed on an ongoing basis. Step 316 may, and sometimes does include step 318, in which the first communications device receives updated state information for said established communications session from the first communications server following a change in state. In various embodiments, the updated state information is provided from the first communications server to the first communications device via a secure web socket established between the first communications device and the first communications server, e.g., a first RTC web server. Operation proceeds from step 318 to step 320, in which the first communications device stores the updated state session state information in memory.

Returning to step 322, in step 322 the first communications device monitors for a loss of the secure socket connection with the first communications server. Step 322 is performed on an ongoing basis. Step 322 may, and sometimes does, include step 324 in which the first communications device detects a loss of the secure socket connection with first communications server. In some embodiments, the detection is the detection of the loss of a heartbeat message. Operation proceeds from step 324 to step 326, in which the first communications device sends a signal, e.g., a signal including a HTTP POST request message, to initiate a connection with a communications server. In various embodiments, the signal to initiate a connection is send to a load balancer, which selects an available communications server from among a pool of communications servers and forwards the request to the selected server. Operation proceeds from step 326 to step 328 in which the first communications device establishes a secure socket connection with a second communications server, e.g., a second web server. In various embodiments, the first and second communications servers are real time communications (RTC) web servers. In some embodiments, the first communications server and the second communications server are first and second web servers, respectively, and are part of a Web RTC server pool. Operation proceeds from step 328 to step 330.

In step 330 the first communications device operates the web browser to provide stored session state information to the second communications server following a loss of connection with said first communications server. In various embodiments, the stored state information is provided from the first communications device to the second communications server via a secure web socket established between the first communications device and the second communications server, e.g., a second RTC web server. In some embodiments, step 330 includes one or both of steps 332 and 334. In step 332 the first communications device provides the second communications server the most recently stored session state information. The various embodiments, the first communications device provides the second communications server the most recently stored session state information via a HTTP connection, e.g., a secure web socket connection established with the second communications server, e.g., a second RTC web server. In step 332 the first communications device sends the stored session state information to the second communications server via the secure socket connection with the second communications server. In some embodiments, steps 330 and 332 are performed jointly.

In various embodiments, session state information is encrypted and signed by the first communications server, e.g., a first web server, which supplies the session state information to the first communications device. Thus in various embodiments, session state information, received by the first communications device in step 310 and/or step 316 is encrypted and signed. In some such embodiments, the first communications device does not include information needed to decrypt the session state information.

In some embodiments, the second communications server, e.g., a second web server, is a web server in a pool of web servers which also includes the first web server, and the second web server has access to or includes decryption information sufficient to allow the second web server to decrypt the encrypted session state information generated by the first web server.

In various embodiments, each web server in the pool of web servers encrypts and signs session state information communicated to the first communications device, and each web server in the pool of web servers has access to or includes decryption information sufficient to decrypt the encrypted session state information generated by other servers in the pool of web servers.

In some embodiments, the web servers in the pool of web servers do not store session state information corresponding to the communications session in a memory accessible to other web servers in the pool. In some embodiments, the system does not use a common memory for web server storage of session state or redundancy of such session state.

In various embodiments, a first communications device, e.g., an end user device, stores and passes session state information to second web server in the event of a failure/ loss of a connection with a first web server, e.g., the loss of a secure web socket connection with a first web server. In various embodiments, the first and second web servers support the use of HTTP signaling and, optionally, secure web sockets, used to establish a communications session. In various embodiments, session, e.g., call, control signaling is over a HTTP connection, e.g., a secure web socket connection, established between first user device and a web server. Call control signaling may be SIP (Session Initiation Protocol) signaling or another form of call control signaling which can be converted by the web server to SIP for purposes of call establishment and call control. SDP (Session description protocol) signaling may be used in combination with SIP to communicate session requirements such as bandwidth, media type, etc., as part of the call control signaling.

Figure 4:
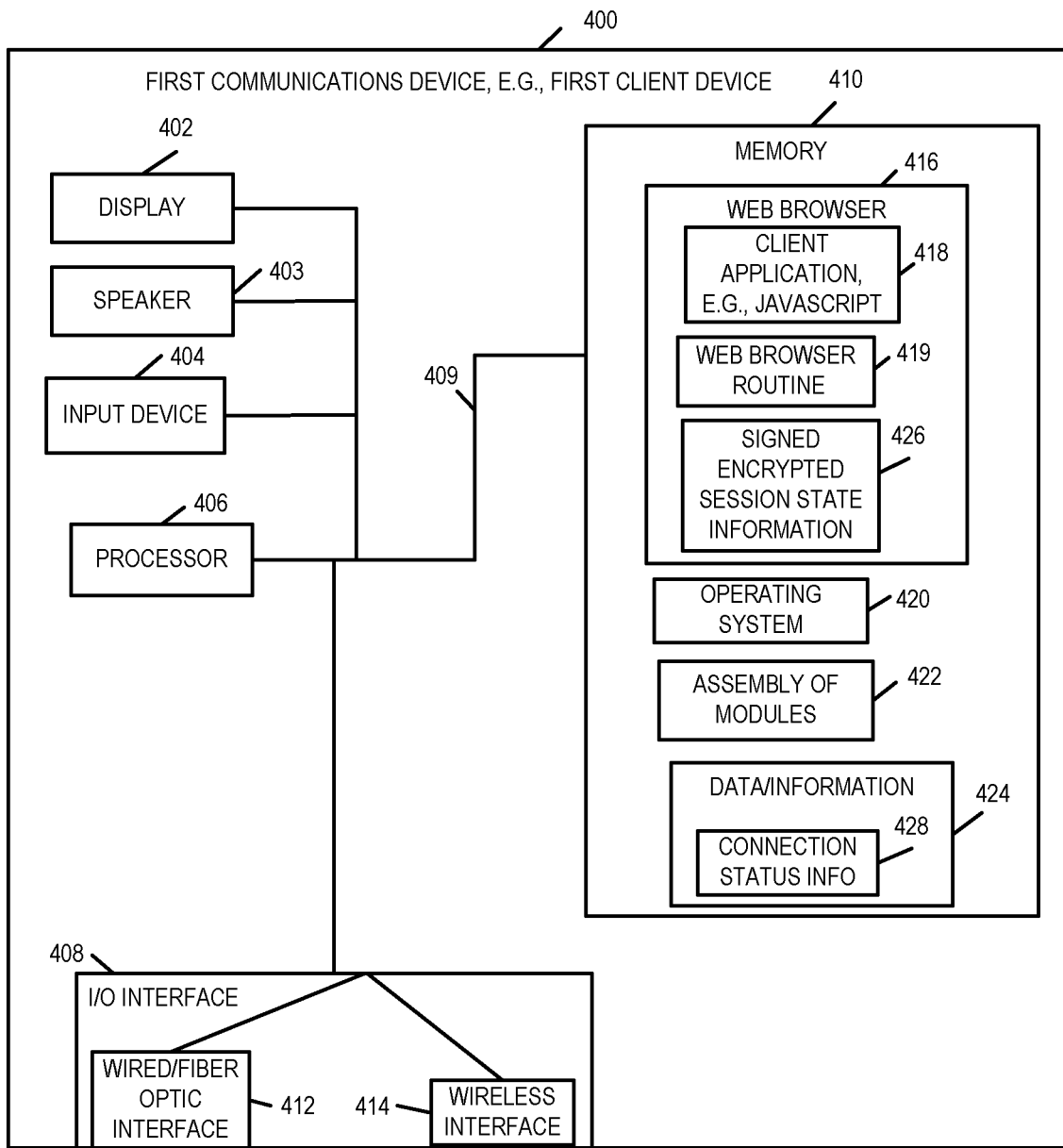
FIG. 4 is a drawing of an exemplary first communications device, e.g., a client device, in accordance with various exemplary embodiments.

FIG. 4 is an exemplary first communications device 400, e.g., a client device, in accordance with various exemplary embodiments. Exemplary first communications device 400 is, e.g., exemplary first communications device 102 of FIG. 1, exemplary client device 1 201 of FIG. 2 and/or a first communications device implementing a method in accordance with flowchart 300 of FIG. 3. Exemplary first communications device 400 includes a display 402, a speaker 403, an input device 404, a processor 406, an I/O interface 408, and memory 410 coupled together via a bus 409 over which the various elements may interchange data and information. I/O interface 408 includes a wired/fiber optic interface 412 and a wireless interface 414. Memory 410 includes a web browser 416, an operating system 420, an assembly of modules 422 and data/information 424. Web browser 416 includes a client application 418, e.g., a JavaScript application, which has been downloaded, a web browser routine 419, and signed encrypted session state information 426. Data/information 424 includes connection status information 428.

Display 402 displays information to the user of first communications device 400, e.g., a selected web page including a call button, a request for user input captcha, received video, etc. Input device 404, e.g., touchscreeen interface, keyboard, microphone, etc., receives user input, e.g., user input indicating selection of a call button, user input in response for a request for user input captcha, voice signals corresponding to a call, etc. Speaker 403 outputs audio signals, e.g., voice signals corresponding to a call, music signals, etc.

Processor 402, e.g., a CPU, executes routines and uses data/information in memory 404 to control operation of first communications device 400 and implement the steps of a method, e.g., the method of flowchart 300 of FIG. 3. I/O interface 408 couples the first communications device 400 to other devices and/or the Internet.

Figure 5:
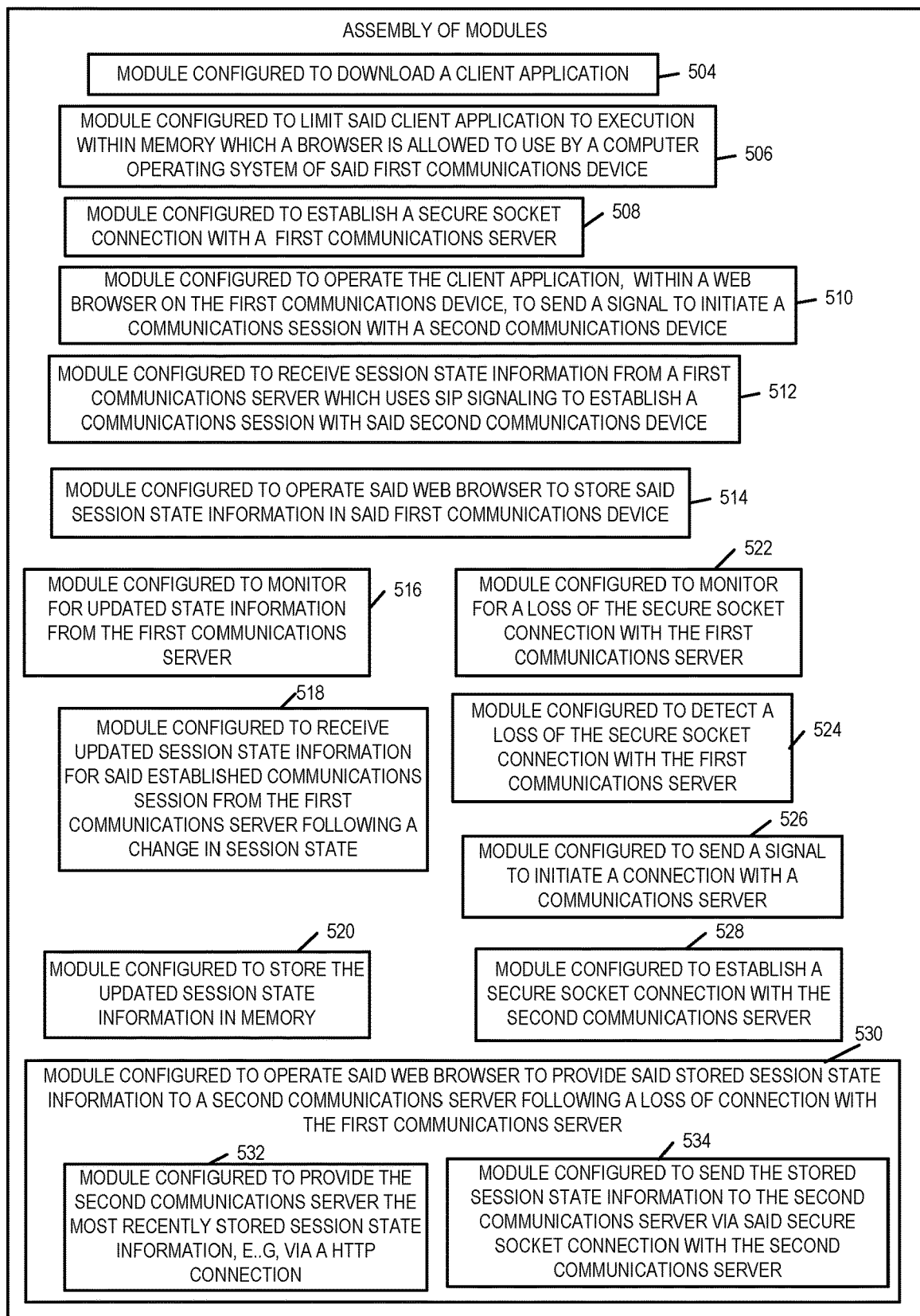
FIG. 5 is a drawing of an assembly of modules which may be included in the exemplary first communications device of FIG. 4 in accordance with an exemplary embodiment.

FIG. 5 illustrates an assembly of modules 500 which can, and in some embodiments is, used in the first communications device 400 illustrated in FIG. 4. In some embodiments the assembly of modules 500 can be implemented in hardware within the processor 406 of the first communications device 400, e.g., as individual circuits. The modules in the assembly 500 can, and in some embodiments are, implemented fully in hardware within the processor 406, e.g., as individual circuits. In other embodiments some of the modules are implemented, e.g., as circuits, within the processor 406 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 410 of the communications device 400, with the modules controlling operation of first communications device 400 to implement the functions corresponding to the modules when the modules are executed by a processor, e.g., processor 406. In some such embodiments, the assembly of modules 500 is included in the memory 410 as assembly of modules 422. In still other embodiments, various modules are implemented as a combination of hardware and software, e.g., with another circuit external to the processor providing input to the processor 406 which then under software control operates to perform a portion of a module's function. While shown in the FIG. 4 embodiment as a single processor, e.g., computer, it should be appreciated that the processor 406 may be implemented as one or more processors, e.g., computers.

When implemented in software the modules include code, which when executed by the processor 406, configure the processor 406 to implement the function corresponding to the module. In embodiments where the assembly of modules 500 is stored in the memory 410, the memory 410 is a computer program product comprising a computer readable medium comprising code, e.g., individual code for each module, for causing at least one computer, e.g., processor 406, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 5 control and/or configure the first communications device 400 or elements therein such as the processor 406, to perform the functions of the corresponding steps illustrated in the method flowchart 300 of FIG. 3. Thus the assembly of modules 500 includes various modules that perform functions of the corresponding steps of the method shown in FIG. 3.

Assembly of modules 500 includes a module 504 configured to download a client application, a module 506 configured to limit said client application to execution within memory which a browser is allowed to use by a computer operating system of the first communications device, a module 508 configured to establish a secure socket connection with a first communications server, e.g., a first web server, and a module 510 configured to operate the client application, within the web browser on the first communications device, to send a signal to initiate a communications session with a second communications device. In various embodiments the client application is a JavaScript application. In various embodiments, the first communications device is a first user communications device, e.g., a first cell phone or other device with voice, video and/or multi-media session capabilities. In various embodiments, the signal sent by module 510 to initiate a communications session with a second communications device is a call control signal, which may be a SIP signal, sent over a HTTP connection, e.g., a secure socket connection with a first communications server, e.g., a first web RTC server. In various embodiments, the second communications device is a second user communications device, e.g., a second cell phone or other device with voice, video and/or multi-media session capabilities. In some embodiments, the first communications server establishes the communications session with the second communications device by sending a SIP signal used to establish said session via a session border controller through which control signaling is communicated for establishing a session with said second communications device.

Assembly of modules 500 further includes a module 512 configured to receive session state information from a first communications server which uses SIP signaling to establish a communications session with said second communications device, and a module 514 configured to operate said web browser to store said session state information in the first communications device. In various embodiments module 514 stores the session state information as blob.

Assembly of modules 500 further includes a module 516 configured to monitor for updated state information from the first communications server, a module 518 configured to receive updated state information for said established communications session from the first communications server following a change in session state, and a module 520 configured to store the updated session state information in memory.

Assembly of modules 500 further includes a module 522 configured to monitor for a loss of the secure socket connection with a communications server, a module 524 configured to detect a loss of the secure socket connection with first communications server, e.g., by detecting a loss of a heartbeat message, a module 526 configured to send a signal, e.g., a signal including a HTTP POST request message, to initiate a connection with a communications server, a module 528 configured to establish a secure web socket connection with the second communications server, e.g., a second web server, and a module 530 configured to operate said web browser to provide stored session state information to a second communications server following a loss of connection with the first communications server. Module 530 includes a module 532 configured to operate the web browser to provide the second communications server the most recently stored session state information, and a module 534 configured to send the stored session state information to second communications server via the secure socket connection with second communications server. In various embodiments, modules 532 is configured to operate the web browser to provide the second communications server the most recently stored session state information via a HTTP connection, e.g., via a secure web socket established with the second communications server, e.g., a second RTC web server.

Modules 524 and 526 perform their operations prior to providing said stored session state information to the second communications server.

In some embodiments, module 518 is included as part of module 516. In some embodiments, module 524 is included as part of module 522.

In various embodiments, the first communications server and the second communications server are web servers. In some such embodiments, the first and second web server are real time communications (RTC) web servers. In some embodiments, the first web server and the second web server are part of a Web RTC server pool. In some embodiments, the session state information, received by module 512 and/or module 518, is encrypted and signed by the first communications server which provides the session state information to the first communications device. In some such embodiments, the first communications device does not include the information needed to decrypt the session state information. In some such embodiments, the second communications server, e.g., second web server, is in a pool of communications servers, e.g., a pool of web server, which also includes the first communications server, e.g., first web server, and the second communications server has access to or includes decryption information sufficient to allow the second communications server to decrypt the encrypted session state information generated by the first communications server.

In some embodiments, the web servers in the pool of web servers do not store session state corresponding to the communications session in a memory accessible to other web servers in said pool. In some embodiments, the system including the pool of web servers does not use a common memory for web server storage of session state or redundancy of such session state.

In some embodiments, module 516 includes module 518. In some embodiments, module 522 includes module 524. In various embodiments module 530 and module 532 are combined into a single module. In some embodiments, one or both of modules 530 and 532 are distinct modules located external to module 528.

Figure 6A:
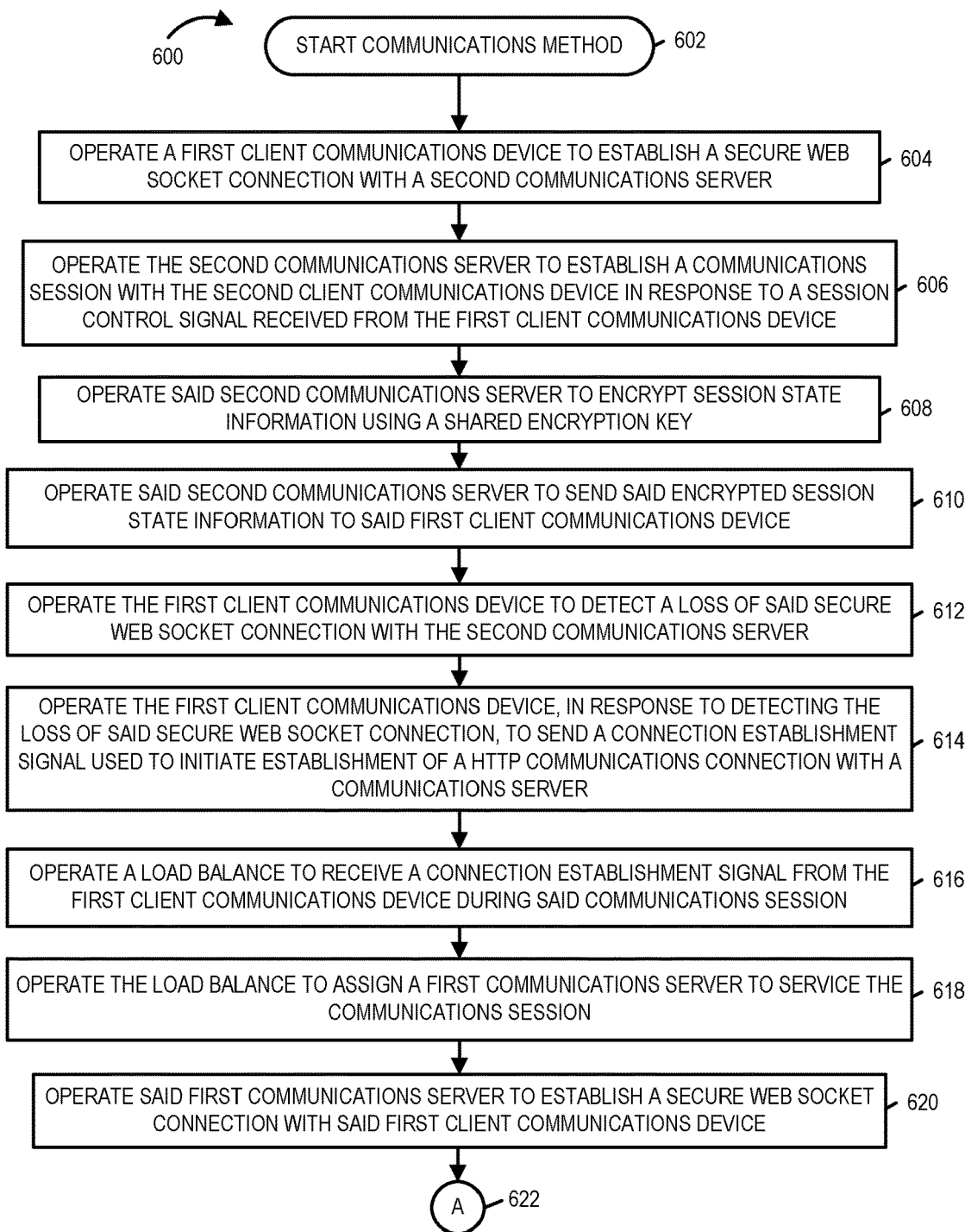
FIG. 6A is a first part of a flowchart of an exemplary communications method in accordance with an exemplary embodiment.

FIG. 6, comprising the combination of FIG. 6A and FIG. 6B, is a flowchart 600 of an exemplary communications method in accordance with an exemplary embodiment. Operation starts in step 602, in which devices in the communications system are powered on and initialized. Operation proceeds from step 602 to step 604.

In step 604, a first client communications device is operated to establish a secure web socket connection, e.g., a secure HTTP web socket connection, with a second communications server. Operation proceeds from step 604 to step 606. In step 606 the second communications server is operated to establish a communications session with a second client communications device in response to a session control signal, e.g., a session initiation protocol (SIP) or JavaScript Session Establishment Protocol (JSEP) signal, received from the first client communications device. Operation proceeds from step 606 to step 608.

In step 608 the second communications server is operated to encrypt session state information using a shared encryption key. Operation proceeds from step 608 to step 610. In step 610 the second communications server is operated to send the encrypted session state information to said first client communications device. Operation proceeds from step 610 to step 612. In step 612 the first client communications device is operated to detect a loss of said secure web socket connection with the second communications server. The loss of the secure web socket connection, is some embodiments, is detected by detecting the loss of a heartbeat message. Operation proceeds from step 612 to step 614.

In step 614, the first client communications device is operated to send a connection establish signal, e.g., a HTTP POST request, used to initiate establishment of a HTTP communications connection with a communications server in response to detecting the loss of said secure web socket connection. The connection establishment signal may include the IP address or other information corresponding to the first client communications device thereby providing information that may be used by a load balancer receiving the connection establishment signal to route the signal to a communications server in accordance with the load balancer's load balancing logic which will result in the connection establishment signal being routed to a different communications server, e.g., the first communications server when the second communications server is not available, e.g., due to a failure or for some other reason. Operation proceeds from step 614 to step 616.

In step 616 a load balancer is operated to receive a connection establishment signal from the first client communications device during said communications session. In step 618 the load balancer is operated to assign a first communications server to service the communications session. For example, the second communications server is not available due to failure, loading or is simply not assigned to handle the signal because of load balancing issues. Operation proceeds from step 618 to step 620.

In step 620 the first communications server is operated to establish a secure web socket connection, e.g., a secure HTTP connection, with said first client communications device. Operation proceeds from step 620, via connecting node A 622 to step 624. In step 624 the first communications server receives encrypted session state information from the first client communications device, said encrypted session state information being received at a point in time during which the first client communications device has a communications session with the second client communication device, said encrypted session state information corresponding to an ongoing communications session. Step 624 includes step 626 in which the first communications server is operated to receive said encrypted session state information in a message received from the first client communications device over a secure HTTP connection between the first client communications device and the first communications server while said session is ongoing. Operation proceeds from step 624 to step 628

In step 628 the first communications server decrypts said encrypted session state information to recover decrypted session state information corresponding to said ongoing session. Step 628 includes step 630 in which the first communications server performs said decrypting using a shared encryption key known to both the first communications server and the second communications server, said second communications server being a server which generated said encrypted session state information. In various embodiments, the shared encryption key is not known to said first and second client communications devices. In some embodiments, the client communications devices are user devices, e.g., phones such as smart phones running a web browser or personal computers running a web browser, and the first and second communications servers are RTC web servers. Operation proceeds from step 628 to step 632.

In step 632 the first communications server uses said decrypted session state information to perform a session control function corresponding to said ongoing communications session. Operation proceeds from step 632 to step 634.

In step 634 the first communications server is operated to make a change to state information corresponding to said communications session thereby producing updated state information corresponding to said communications session. The produced updated state information may be a partial update or full new set of state information. The change to state information is made, e.g., in response to a first client communications device to communications session, e.g., call, control signal used to trigger a change in the session involving modification of session state or in response to a change in network conditions such as a change in available communications resources being used by said communications session. The session, e.g., call, control signal may be a SIP or JSEP signal or another signal communications from the first client communications device over the HTTP connection, e.g., secure HTTP web socket connection, to the first communications server which then uses the session control signal to implement the session change. Alternatively, the second client communications device may trigger the change in the session via a session, e.g., call, control signal. Operation proceeds from step 634 to step 636.

In step 636 the first communications server is operated to encrypt said updated state information using the shared key. Operation proceeds from step 636 to step 638.

In step 638 the first communications server is operated to send the encrypted updated state information to the first client communications device to replace or supplement the previously provided encrypted state information corresponding to the communications session.

In various embodiments, the first client communications device is, e.g., a first user communications device such as, e.g., a cell phone or other device with voice, video and/or multi-media session capabilities; and the second client communications device is, e.g., a second user communications device such as, e.g., a cell phone or other device with voice, video and/or multi-media session capabilities. In some embodiments, the first communications server and the second communications server are web servers, e.g., RTC web servers, which support secure HTTP communications connections, e.g., secure web sockets. In various embodiments, the first communications server and second communications server are web servers, e.g., RTC web servers, which are part of a web server pool, e.g., a web RTC server pool. In some such embodiments, encryption keys are shared by the web servers in the pool.

Figure 7:
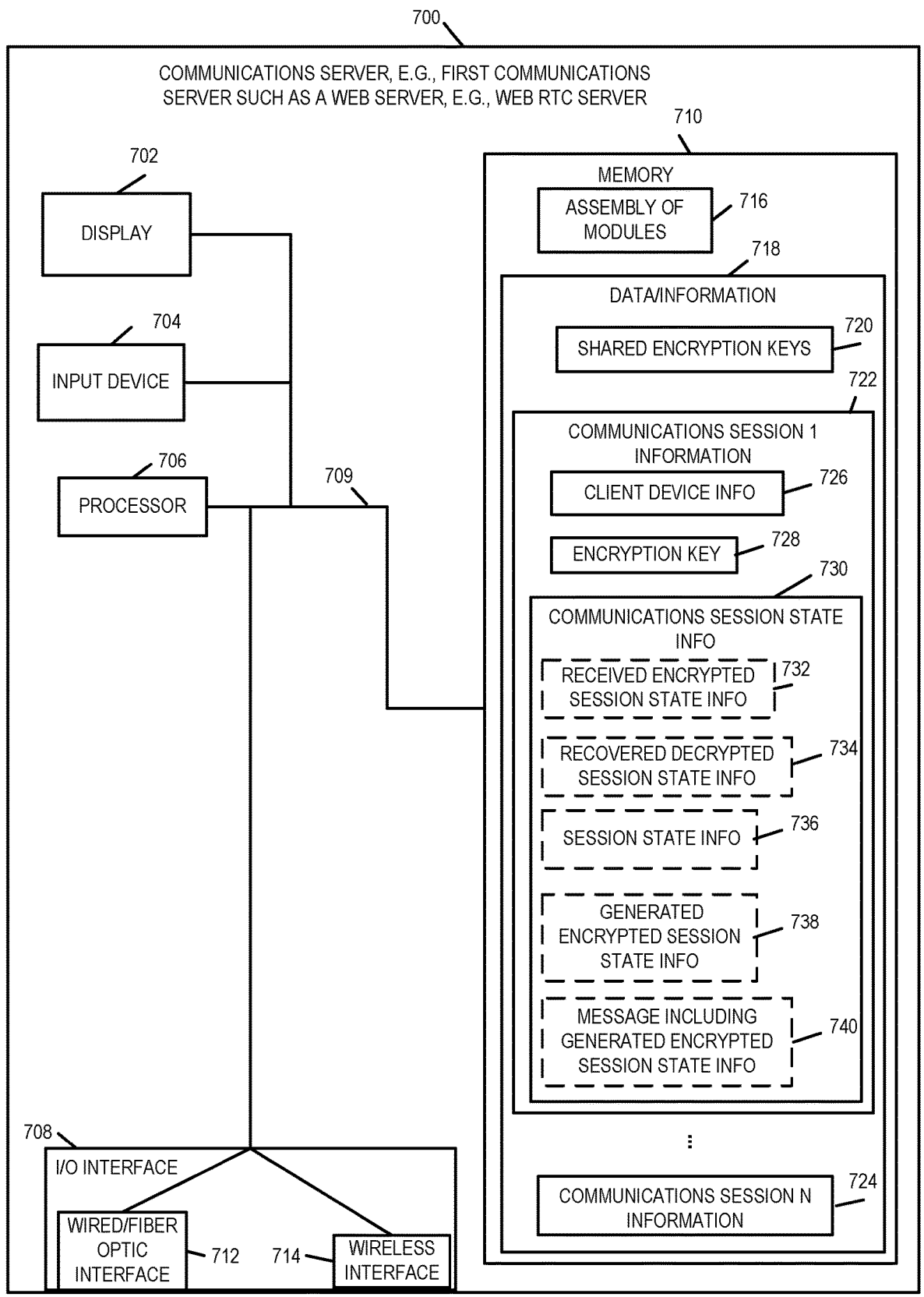
FIG. 7 is an exemplary communications server, e.g., a first RTC web server, in accordance with an exemplary embodiment.

FIG. 7 is a drawing of an exemplary communications server 700, e.g., a first communications server in accordance with an exemplary embodiment. Exemplary communications server 700 is, e.g., one of the web RTC servers (110, . . . , 112) of FIG. 1, one of the web RTC servers (212, 220) of FIG. 2, and/or a communications server implementing some of the steps of flowchart 600 of FIG. 6, e.g., steps performed by a communications server. The communications server 700 is, e.g., a web server such as a web RTC server.

Exemplary communications server 700 includes a display 702, input device 704, processor 706, I/O interface 708 and memory 710 coupled together via bus 709 over which the various elements may interchange data and information. I/O interface 708 includes a wired and/or fiber optic interface 712 and a wireless interface 714. Memory 710 includes an assembly of modules 716 and data/information 718. Data/information 718 included shared encryption keys 720 and communications session information corresponding to one or more communications sessions (communications session 1 information 722, . . . , communications session N information 724). Communications session 1 information 722 includes client communications device information 726, encryption key 728, and communications session state information 730. Communications session state information 730 includes one or more or all of: received encrypted session state information 732, recovered decrypted session state information 734, session state information 736, generated encrypted session state information 738, and generated message 740 including generated encrypted session state information.

Processor 702, e.g., a CPU, executes routines and uses data/information in memory 710 to control operation of communications server 700 and implement the steps of a method, e.g., the steps of the method of flowchart 600 of FIG. 6 corresponding to a communications server. I/O interface 708 couples the communications server 700 to other devices and/or the Internet.

Figure 8A:
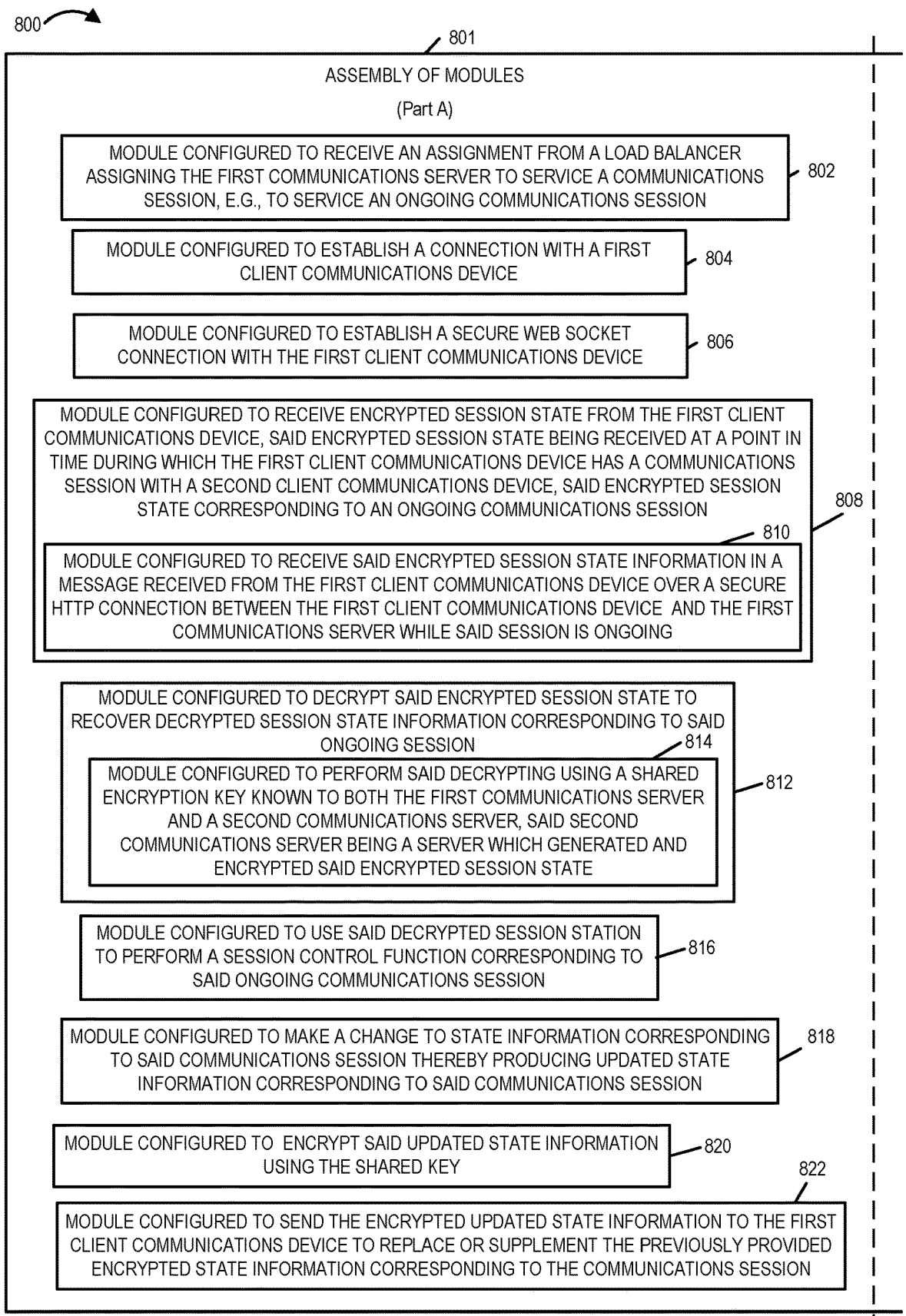
FIG. 8A is a drawing of a first part of an assembly of modules which may be included in the exemplary communications server of FIG. 7 in accordance with an exemplary embodiment.
Figure 8B:
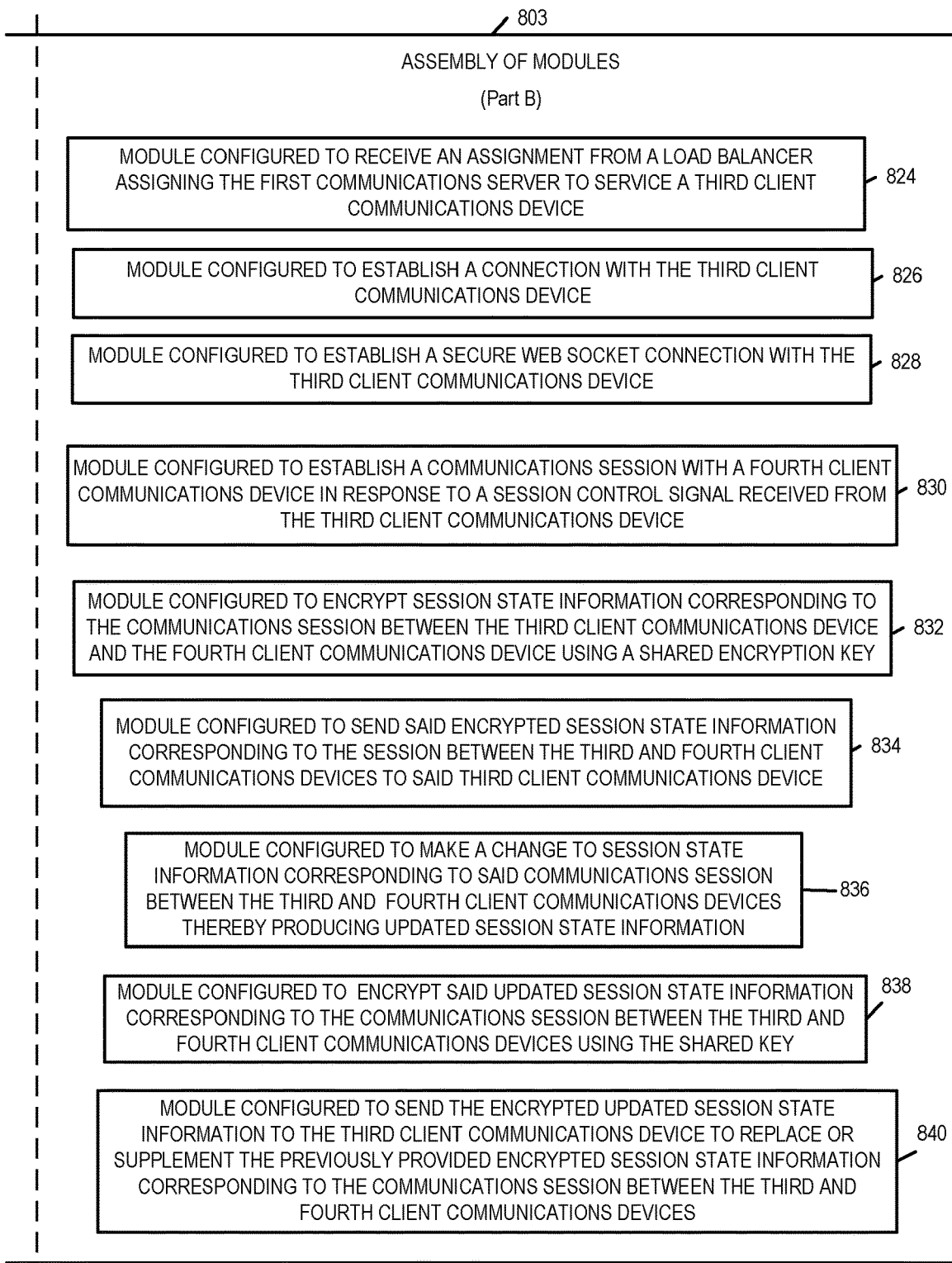
FIG. 8B is a drawing of a second part of an assembly of modules which may be included in the exemplary communications server of FIG. 7 in accordance with an exemplary embodiment.
Figure 8:
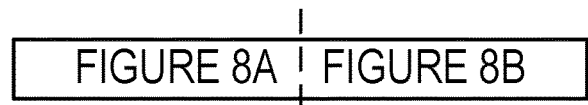
FIG. 8 comprises FIGS. 8A and 8B.

FIG. 8 illustrates an assembly of modules 800 which can, and in some embodiments is, used in the communications server 700 illustrated in FIG. 7. In some embodiments the assembly of modules 800 can be implemented in hardware within the processor 706 of the communications server 700, e.g., as individual circuits. The modules in the assembly 800 can, and in some embodiments are, implemented fully in hardware within the processor 706, e.g., as individual circuits. In other embodiments some of the modules are implemented, e.g., as circuits, within the processor 706 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 710 of the communications server 700, with the modules controlling operation of communications server 700 to implement the functions corresponding to the modules when the modules are executed by a processor, e.g., processor 706. In some such embodiments, the assembly of modules 800 is included in the memory 710 as assembly of modules 716. In still other embodiments, various modules are implemented as a combination of hardware and software, e.g., with another circuit external to the processor providing input to the processor 706 which then under software control operates to perform a portion of a module's function. While shown in the FIG. 7 embodiment as a single processor, e.g., computer, it should be appreciated that the processor 706 may be implemented as one or more processors, e.g., computers.

When implemented in software the modules include code, which when executed by the processor 706, configure the processor 706 to implement the function corresponding to the module. In embodiments where the assembly of modules 800 is stored in the memory 710, the memory 710 is a computer program product comprising a computer readable medium comprising code, e.g., individual code for each module, for causing at least one computer, e.g., processor 706, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 8 control and/or configure the communications server 700 or elements therein such as the processor 706, to perform the functions of corresponding steps illustrated in the method flowchart 600 of FIG. 6. Thus the assembly of modules 800 includes various modules that perform functions of corresponding steps of the method shown in FIG. 6.

FIG. 8, comprising the combination of FIG. 8A and FIG. 8B, is a drawing of an assembly of modules 800 including Part A 801 and Part B 803, in accordance with an exemplary embodiment. Assembly of modules 800 may be included in a communications server, e.g., a first communications server. The first communications server is, e.g. a web server such as a RTC web server. Assembly of modules 800 includes a module 802 configured to receive an assignment from a load balancer assigning the first communications server to service a communications session, e.g., to service an ongoing communications session between a first client communications device and a second client communications device, a module 804 configured to establish a connection with a first client communications device, and a module 806 configured to establish a secure web socket connection, e.g., a secure HTTP connection, with the first client communications device. Assembly of modules 800 further includes a module 808 configured to receive encrypted session state information from the first client communications device, said encrypted session state information being received at a point in time during which the first client communications device has a communications session with a second client communication device, said encrypted session state corresponding to an ongoing communications session. Module 808 includes a module 810 configured to receive said encrypted session state information in a message from the first client communications device over a secure HTTP connection, e.g., a secure web socket, between the first client communications device and the first communications server while said communications session is ongoing.

Assembly of modules 800 further includes a module 812 configured to decrypt said encrypted session state information to recover decrypted session state information corresponding to said ongoing session. Module 812 includes a module 814 configured to perform said decrypting using a shared encryption key known to both the first communications server and a second communications server, said second communications server being a server which generated and encrypted said encrypted session state information. In various embodiments, the shared encryption key is not known to the first or second client communications devices. In some embodiments, the client communications devices, e.g., first and second client communications devices are user devices, e.g., phones or personal computers running a web browser, and the first and second communications servers are RTC web servers. Assembly of modules 800 further includes a module 816 configured to use said decrypted session state information to perform a session control function corresponding to said ongoing communications session, and a module 818 configured to make a change to state information corresponding to said communications session thereby producing updated state information corresponding to said communications session. The produced updated session state information may be a partial update or full new set of state information corresponding to said communications session. The change to state information is made, e.g., in response to a first client communications device to communications session, e.g., call, control signal used to trigger a change in the session involving modification of session state or in response to a change in network conditions such as a change in available communications resources being used by said communications session. The session, e.g., call, control signal may be a SIP or JSEP signal or another signal communications from the first client communications device over the HTTP connection, e.g., secure HTTP web socket connection, to the first communications server which then uses the session control signal to implement the session change. Alternatively, the second client communications device may trigger the change in the session via a session, e.g., call, control signal.

Assembly of modules 800 further includes a module 820 configured to encrypt said updated state information using the shared key, and a module 822 configured to send the encrypted updated state information to the first client communications device to replace or supplement the previously provided encrypted state information corresponding to the communications session.

Assembly of modules 800 further includes a module 824 configured to receive an assignment from a load balancer assigning the first communications server to service a third client communications device, a module 826 configured to establish a connection with the third client communications device, a module 828 configured to establish a secure web socket connection with the third client communications device, and a module 830 configured to establish a communication session with a fourth client communications device in response to a session control signal received from the third client communications device. Assembly of modules 800 further includes a module 832 configured to encrypt session state information corresponding to the communications session between the third client communication service and the fourth client communications device using a shared encryption key, a module 834 configured to send said encrypted session state information corresponding to the session between the third and fourth client communications devices to said third client communications device, a module 836 configured to make a change to session state information corresponding to said communications session between the third and fourth client communications devices thereby producing updated state information, a module 838 configured to encrypt said updated session state information corresponding to the communications session between the third and fourth client communications devices using the shared key, and a module 840 configured to send the encrypted updated session state information to the third client communications device to replace or supplement the previously provided encrypted session state information corresponding to the communications session between the third and fourth client communications devices.

In various embodiments, the first communications server and said second communications server are real time communications (RTC) web servers which support secure HTTP communications connections, e.g., secure web sockets. In some such embodiments, said first web server and said second web server are part of a Web RTC server pool.

In various embodiments, the client communications devices, e.g., first second third and fourth client communications devices, are user communications devices such as, e.g., a cell phone or other device with voice, video and/or multi-media session capabilities.

Various aspects and/or features of some embodiments are further discussed below. Various embodiments relate to methods and apparatus for achieving high-availability (HA) of WebRTC by storing the session state information in the WebRTC client in place of storing the session station information in a standby WebRTC server.

Web Socket is a web technology providing full-duplex communications channels over a single TCP connection between client/browser and the Application/webserver. The WebSocket API is being standardized by the W3C. WebSocket protocol has been standardized by the IETF as RFC 6455. The WebSocket Protocol is an independent TCP-based protocol. Its only relationship to HTTP is that its handshake is interpreted by HTTP servers as an Upgrade request. Once WebSocket handshake is complete, HTTP connection is replaced with WebSocket on the same TCP connection.

WebSocket protocol itself is unaware of proxy servers and firewalls; it features an HTTP-compatible handshake so that HTTP servers can share their default HTTP and HTTPS ports (80 and 443) with a WebSocket gateway or server.

A webRTC server is a server including an application providing browser based access (Web Access) to communication infrastructure. It interworks the signaling protocol received over WebSocket from the browser into standard SIP over UDP/TCP/TLS etc.

The following describes various steps in interworking a call from WebRTC client in Browser and a Standard SIP phone.

User Identity and Authentication operations are performed. It is expected that a merchant website will provide the identity and authentication to the user. Several examples are described below.

Skype ID/Facebook Login—to enable WebRTC calling using Skype/Facebook
Windows ID/Windows ID—to enable Employs to call using company voice infrastructure,
Portal Login ID—Login ID given by merchant to enable its customers, Employees or partners to use the service on the website
No Login needed—In certain Customer support or sales case akin to 1800-TOLL-Free Dialing A user loads the WebRTC App and/or client application in the web browser. In some embodiments, a merchant site provides java script client library. In some embodiments, the merchant site proxies/redirects the request towards WebRTC server. A user initiates a call to a called party. The called party can correspond to a link to Sales/Support or a phone number. The user's browser learns its Public IPs using TURN/STUN procedures; WebApp and browser puts together the SDP offer for making the call and sends the same over WebSocket to WebRTC server. The WebRTC server interworks the Session offer received over WebSocket into Standard SIP/SDP signaling towards a SBC. The SBC performs the ICE/STUN IP connectivity procedures and converts DTLS-SRTP into RTP/UDP towards SIP based voice infrastructure.

Telcom servers providing real time communication servers are deployed in high availability mode. So, that in the event of failure of a server another server takes over the processing. Commonly, the telecom high availability systems use the mechanism to replicate the call state data from the activate node to standby node. There are various variations of HA scheme which are possible, like 1-1 Active-standby, 1-1 Active-Active, N-1 Active-standby or M:N active standby configurations. However, all these configurations are currently realized by replicating the session state information from the Active node to the standby node or to another active node. When the active node goes down, the node with backup of the session state information takes over the call processing.

Various aspects and/or features in accordance with some embodiments of the present invention are described below. A WebRTC client application is java script code which may run in a browser sandbox environment, typically provided by the server application. So, Web Application like WebRTC Server can fully control client behavior (by java script).

HTTP/Web Socket communication allows the Client application in the browser and the WebRTC Server to securely exchange data with each other. In accordance with a feature of the present invention, a WebRTC server utilizes the Client application in the browser to store the session state information.

It utilizes the propriety APIs (or Messages) between the WebRTC server and WebRTC client over the WebSocket connection, to store and retrieve the session state information.

Note, static policy and routing data would be stored in a common routing database, which can be accessed by the WebRTC servers in the pool. This will enable each of the WebRTC servers, with access to the common routing database, to route the calls towards appropriate WebRTC clients using same policy and routing data information.

The following explains various steps and procedures during the switchover of the WebRTC server for a call. Described below are some of the main points about the HA scheme in accordance with various embodiments of the present invention. When a WebRTC session is established, a WebRTC server pushes the session state information for the session to the client in browser. Subsequently, the WebRTC server will push the session state information to the client every time there is change in call state or session is modified. The WebRTC Server encrypts and signs the session state information, for additional security. A pool of WebRTC servers will share the keys in way that message encrypted by the WebRTC Server1 can be decrypted by the WebRTC Server2 in the same pool. WebRTC servers will be able to validate and honor the signs/certificate of the WebRTC server in the pool. The Client App in the browser stores the 'Session state information' as blob in the memory. This information is not interpreted by client (java script code).

The WebRTC client and WebRTC Server exchange the application level heartbeat message to ensure WebSocket connection is up and client and server are able to talk to each other. In the case when WebRTC client is on Mobile, WebRTC server could contact the mobile using optimized messaging frameworks like Google Could messaging for Android and Apple APNS for iOS mobiles.

When an active WebRTC server goes is down, the client detects failure of the server (heartbeat failed), the Client in browser establishes a new WebSocket towards the WebRTC server in the pool of servers which are up. Optionally, a HTTP Load balancer can select another WebRTC server for the request.

A newly active WebRTC Server accepts the WebSocket connection and requests any session state information. If the valid session state information is received, WebRTC server will update the call state (SIP stack structures and application data related to a session) in its memory. From this point on, any new requests for the session will be handled by new WebRTC server as normal requests within a session based on session state information.

When a WebRTC client sends any mid-dialog request, the request will be sent through the WebSocket connection to the newly active WebRTC server.

When a mid-dialog request is received from SIP Endpoint, the load balancer in front of the WebRTC server pool will route the request to the correct WebRTC server instance. This will in turn select the WebSocket for sending message towards the WebRTC client.

Currently, there are few techniques as described below for Web servers to store state information in the browser, which the browser sends back to Web server every time Web site URL is accessed.

Passing State Information with Cookies
Passing State Information with the URLData Property
Using Hidden Field However, all of these have limitations in terms of size of the data, control over access to data and where these can be used. So, they are not suitable for implementing server high availability.

Various embodiments, in accordance with the present invention, introduce new architecture for supporting Server high availability in the WebRTC world. In this new model, in accordance with a feature of the present invention, session state information storage is offloaded to Clients. This approach results into more efficient WebRTC Server implementation, scalability and resilience.

COOKIES suffer the limitations of packet size and some browsers may be disabling the cookies, so HA cannot be reliably implemented using Cookies. Using java script client to track the state will be reliable and have no limitations in terms of amount of data.

An exemplary method, in accordance with the present invention, utilizes propriety APIs between the WebRTC server and WebRTC client over the WebSocket connection, to store and retrieve the session state information. This new approach does not suffer the limitations of methods in use today for passing state information between browser and Webservers.

In various embodiments, in accordance with the present invention, storage of the session state information is offloaded to the client in the browser. So, there is no need to replicate the data across WebRTC servers. This results in High availability and better scaling. Also, this approach simplifies the HA aspects of the WebRTC server design, resulting in a much lighter implementation.

Various embodiments of the present invention introduce one or more or all of the following procedures on WebRTC server and/or WebRTC client. Various exemplary methods utilizes propriety APIs between the WebRTC server and WebRTC client over the WebSocket connection, to store and retrieve the session state information. In various embodiments, the WebRTC server signs and encrypts the Session state information and sends it to the WebRTC client. In various embodiments, the WebRTC client (java script) includes the ability to store the session state information received from the WebRTC server as a blog. The WebRTC client (java script) includes the capability to present the session state information to the WebRTC server while attempting to re-establish signaling channel. The WebRTC Server retrieves the session state information and loads it in its memory, for processing any requests in that session.

Various steps, features, and/or aspects of the present invention can be implemented in a Web App, Javascript, a client device, a web browser, a web page server, a web server, e.g., an web RTC server, and/or a session border controller (SBC) such as a SBC including a media proxy. Various described methods and/or apparatus are well suited for RTCWeb based scenarios, where legacy SIP world is accessed via SIP off the JavaScript in browser. Various described methods, features and/or aspects can be, and sometimes are used in a Web App, a Javascript supplied by Web App., and/or a SBC. Various described methods and apparatus are well suited for RTCWeb deployments accessing legacy SIP world.

Various embodiments are directed to an end user device which stores and passes session state to a second Web server in the event of a failure/loss of a secure web socket connection with a first Web server (e.g., a server which supports the use of HTTP signaling and, optionally, secure web sockets) used to establish a communications session—call control signaling is over a HTTP connection established between first user device and web server. Call control signaling may be SIP (Session Initiation Protocol) signaling or another form of call control signaling which can be converted by the Web server to SIP for purposes of call establishment and call control. SDP (Session description protocol) signaling may be used in combination with SIP to communicate session requirements such as bandwidth, media type, etc. as part of the call control signaling.

The techniques of various embodiments may be implemented using software, hardware and/or a combination of software and hardware. Various embodiments are directed to apparatus, e.g., a communications device such as client device including a web browser, a communications server such as web server, e.g. a web RTC server, a web page server, a load balancer, a session border controller, e.g., a session border controller including a media proxy, media proxies, web servers, e.g., a call server, etc. Various embodiments are directed to a communications system, e.g., a communications system including a plurality of client communications devices each including a web browser, a plurality of web servers, e.g., web RTC servers, a load balancer, a web page server, a SBC, and a IMS or PBX. Various embodiments are also directed to methods, e.g., a method of operating a communications device such as a client device including a web browser, a method of operating a communications server such as a web server, e.g., a web RTC server, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal generation, signal transmission, signal reception, signal processing, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a client device including a web browser or a session border controller (SBC) including a media proxy or a web server such as a web page server, including a processor configured to implement one, multiple or all of the steps of one or more methods of the invention.

In some embodiments, the processor or processors, e.g., CPUs, of one or more devices, e.g., of the communications device or session border controller or web server, are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device or session border controller or web server, with a processor which includes a module corresponding to each of the steps of the various described methods performed by the device in which the processor is included. In some but not all embodiments an apparatus, e.g., a communications device or session border controller or web server, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or a session border controller or a web server. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first client communications device, the method comprising:
   downloading, by the first client communications device, a client application;
   operating the client application, within a web browser on the first client communications device, to send a signal to initiate a communications session with a second client communications device;
   receiving, by the first client communications device, session state information from a first communications server which uses Session Initiation Protocol (SIP) signaling to establish a communications session between said first client communications device and said second client communications device, said session state information being for the established communications session between said first client communications device and said second client communications device;
   operating the web browser on the first client communications device to store said received session state information in said first client communications device;
   operating the web browser on the first client communications device to provide said stored session state information to a second communications server following a loss of a connection with the first communications server;
   wherein said session state information received by the first client communications device is encrypted by the first communications server;
   wherein said encrypted session state information is generated by the first communications server; and
   wherein said first client communications device does not have information needed to decrypt the encrypted session state information.

2. The method of claim 1, further comprising:
   receiving, by the first client communications device, updated session state information, for said established communications session between the first client communications device and the second client communications device, from the first communications server following a change in session state; and
   storing, by the first client communications device, the updated session state information in memory at the first client communications device.

3. The method of claim 2,
   wherein the first communications server is a first web server;
   wherein the second communications server is a second web server;
   wherein operating the web browser on the first client communications device to provide said stored session state information to the second web server includes providing the second web server the most recently stored session state information via a HTTP connection.

4. The method of claim 3, wherein said session state information is both encrypted and signed by the first web server which provides the session state information to the first client communications device.

5. The method of claim 4,
   wherein said second web server is a web server in a pool of web servers which also includes said first web server; and wherein the second web server has access to or includes decryption information sufficient to allow the second web server to decrypt the encrypted session state information generated by said first web server.

6. The method of claim 3, wherein said communications session includes a secure socket connection between the web browser in the first client communications device and said first communications server, the method further comprising, prior to operating the web browser on the first client communications device to provide said stored session state information to the second communications server:
    detecting, by the first client communications device, a loss of the secure socket connection with the first communications server;
    sending, by the first client communication device, a signal to initiate a connection with a communications server; and
    establishing, by the first client communications device, a secure socket connection with the second communications server.

7. The method of claim 6, wherein operating the web browser on the first client communications device to provide said stored session state information to the second communications server includes operating the web browser on the first client communications device to send said stored session state information to the second communications server via said secure socket connection with the second communications server.

8. The method of claim 1, wherein the session state information is encrypted using a shared encryption key unknown to the first client communications device.

9. The method of claim 8, wherein the shared encryption key is known to the first communications server and the second communications server.

10. The method of claim 1,
    wherein the first client communications device is a first user communications device;
    wherein the second client communications device is a second user communications device;
    wherein the communications session is a multi-media communications session;
    wherein said communications session includes a secure socket connection between the web browser in the first user communications device and said first communications server, the method further comprising, prior to operating the web browser on the first client communications device to provide said stored session state information to the second communications server:
    detecting, by the first user communications device, a loss of the secure socket connection with the first communications server;
    sending, by the first user communications device, a signal to initiate a connection with a communications server; and
    establishing, by the first user communications device, a secure socket connection with the second communications server.

11. The method of claim 1,
    wherein the first client communications device is a first mobile phone;
    wherein said loss of the connection between the first client communications device and the first communications server results from a failure of the first communications server, said loss of the connection between the first client communications device and the first communications server causing a loss of a signaling control path but not causing a loss of a data communications path between the first client communications device and the second client communications device;
    wherein said second communications server is a replacement communications server for the first communications server which had established said communications session between the first client communications device and the second client communications device, said established communications session being an on-going communications session when the loss of the connection between the first client communications device and the first communications server occurred; and
    wherein said stored session state information includes session control information for the on-going established communications session between the first client communications device and the second client communications device, said session state information being required for the replacement communications server to maintain the on-going communications session between the first client communications device and the second client communications device following said loss of the connection between the first client communications device and the first communications server.

12. The method of claim 11,
    wherein said stored session state information includes SIP stack information for the on-going communications session and transport information for the on-going communications session, said transport information for the on- going communications session including an Internet Protocol address and a port number of the first client communications device being used by the first client communications device to communicate with the second client communications device during said on-going communications session.

13. The method of claim 12,
    wherein said session state information received by the first client communications device from the first communications server is received in a Session Initiation Protocol provisional response answer message transmitted from the first communications server;
    wherein said operating the web browser on the first client communication device to store said received session state information in said first client communications device includes operating the web browser on the first client communications device to store the session state information as a blob in memory of the first client communications device; and
    wherein the first communications server and the second communications server are interworking nodes responsible for interworking application signaling over WebSocket to Session Initiation Protocol signaling for the on-going communications session.

14. A first client communications device comprising:
memory; and
a processor that controls the first client communications device to:
    download a client application;
    operate the client application, within a web browser on the first client communications device, to send a signal to initiate a communications session with a second client communications device;
    receive session state information from a first communications server which uses Session Initiation Protocol (SIP) signaling to establish a communications session between said first client communications device and said second client communications device, said session state information being for the communications session established between said first client communications device and said second client communications device;

operate the web browser on the first client communications device to store said session state information in said first client communications device;

operate the web browser on the first client communications device to provide said stored session state information to a second communications server following a loss of a connection with the first communications server;

wherein said session state information received by the first client communications device is encrypted by the first communications server;

wherein said encrypted session state information is generated by the first communications server; and wherein said first client communications device does not have information needed to decrypt the encrypted session state information.

15. The first client communications device of claim 14, wherein said processor further controls the first client communications device to:

receive, by the first client communications device, updated session state information, for said established communications session between the first client communications device and the second client communications device, from the first communications server following a change in session state; and store, by the first client communications device, the updated session state information in said memory.

16. The first client communications device of claim 15, wherein the first communications server is a first web server;

wherein the second communications server is a second web server; and wherein said operating the web browser on the first client communications device to provide said stored session state information to the second web server includes providing the second web server the most recently stored session state information via a HTTP connection.

17. The first client communications device of claim 16, wherein said session state information is both encrypted and signed by the first web server which provides the session state information to the first client communications device.

18. The first client communications device of claim 17, wherein said second web server is a web server in a pool of web servers which also includes said first web server; and wherein the second web server has access to or includes decryption information sufficient to allow the second web server to decrypt the encrypted session state information generated by said first web server.

19. The first client communications device of claim 16, wherein said communications session includes a secure socket connection between the web browser in the first client communications device and said first communications server; and wherein prior to operating the web browser on the first client communications device to provide said stored session state information to the second communications server, the processor controls the first client communications device to:

detect a loss of the secure socket connection with the first communications server;

send a signal to initiate a connection with a communications server; and establish a secure socket connection with the second communications server.

20. The first client communications device of claim 19, wherein said operating the web browser on the first client communications device to provide said stored session state information to the second communications server includes operating the web browser on the first client communications device to send said stored session state information to the second communications server via said secure socket connection with the second communications server.

21. The first client communications device of claim 14, wherein the session state information is encrypted using a shared encryption key known to the first communications server and the second communications server but is unknown to the first client communications device and the second client communications device.

22. The first client communications device of claim 14, wherein the first client communications device is a first user communications device;

wherein the second client communications device is a second user communications device;

wherein the communications session is a multi-media communications session;

wherein said communications session includes a secure socket connection between the web browser in the first user communications device and said first communications server;

and wherein prior to operating the web browser on the first client communications device to provide said stored session state information to the second communications server, the processor further controls the first client communications device to:

detect a loss of the secure socket connection with the first communications server;

send a signal to initiate a connection with a communications server; and establish a secure socket connection with the second communications server.

23. The first client communications device of claim 14, wherein the first client communications device is a first mobile phone;

wherein said loss of the connection between the first client communications device and the first communications server results from a failure of the first communications server, said loss of the connection between the first client communications device and the first communications server causing a loss of a signaling control path but not causing a loss of a data communications path between the first client communications device and the second client communications device;

wherein said second communications server is a replacement communications server for the first communications server which had established said communications session between the first client communications device and the second client communications device, said established communications session being an on-going communications session when the loss of the connection between the first client communications device and the first communications server occurred; and wherein said stored session state information includes session control information for the on-going established communications session between the first client communications device and the second client communications device, said session state information being required for the replacement communications server to maintain the on-going communications session between the first client communications device and the second client communications device following said loss of the connection between the first client communications device and the first communications server.

24. A non-transitory machine readable medium including a set of processor executable instructions for a first client communications device, which when executed by a processor of the first client communications device control the first client communications device to:
- download, by the first client communications device, a client application;
- operate the client application, within a web browser on the first client communications device, to send a signal to initiate a communications session with a second client communications device;
- receive, by the first client communications device, session state information from a first communications server which uses Session Initiation Protocol (SIP) signaling to establish a communications session between said first client communications device and said second client communications device, said session state information being for the communications session established between said first client communications device and said second client communications device;
- operate the web browser on the first client communications device to store said session state information in said first client communications device;
- operate the web browser on the first client communications device to provide said stored session state information to a second communications server following a loss of a connection with the first communications server;
- wherein said session state information received by the first client communications device is encrypted by the first communications server;
- wherein said encrypted session state information is generated by the first communications server; and
- wherein said first client communications device does not have information needed to decrypt the encrypted session state information.

* * * * *